US012323933B2

United States Patent
Fu

(10) Patent No.: US 12,323,933 B2
(45) Date of Patent: Jun. 3, 2025

(54) METHOD FOR WIRELESS COMMUNICATION AND NETWORK DEVICE

(71) Applicant: GUANGDONG OPPO MOBILE TELECOMMUNICATIONS CORP., LTD., Guangdong (CN)

(72) Inventor: Zhe Fu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 397 days.

(21) Appl. No.: 18/056,869

(22) Filed: Nov. 18, 2022

(65) Prior Publication Data

US 2023/0083152 A1 Mar. 16, 2023

Related U.S. Application Data

(63) Continuation of application No. PCT/CN2020/092681, filed on May 27, 2020.

(51) Int. Cl.
H04J 3/06 (2006.01)
H04W 56/00 (2009.01)

(52) U.S. Cl.
CPC ....... H04W 56/0015 (2013.01); H04J 3/0667 (2013.01)

(58) Field of Classification Search
CPC .................. H04W 56/0015; H04J 3/0667
USPC ......................................... 370/350
See application file for complete search history.

(56) References Cited

U.S. PATENT DOCUMENTS

2021/0359778 A1* 11/2021 Wang ............... H04L 69/28

FOREIGN PATENT DOCUMENTS

| CN | 104410170 | 3/2015 |
|---|---|---|
| CN | 109155788 | 1/2019 |
| CN | 110943899 | 3/2020 |
| EP | 3629499 | 4/2020 |
| WO | 2020021309 | 1/2020 |
| WO | 2020067977 | 4/2020 |

OTHER PUBLICATIONS

"3rd Generation Partnership Project; Technical Specification Group Services and System Aspects; Study on enhancement of 5G System (5GS) for vertical and Local Area Network (LAN) services (Release 16)," 3GPP TR 23.734, Jun. 2019, v16.2.0.
Ericsson, "Merging multiple time domains with 5G clock," 3GPP TSG-SA WG2 Meeting #129BIS, S2-1813066, Nov. 2018.
Huawei et al., "Discussion on supporting multiple time domains for TSN," 3GPP TSG-RAN WG2 #105, R2-1901492, Feb. 2019.
EPO, Extended European Search Report for EP Application No. 20938068.2, Jun. 15, 2023.
"3rd Generation Partnership Project; Technical Specification Group Services and System Aspects; Study on Enhanced Support of Industrial Internet of Things (IIoT) in the 5G System (5GS) (Release 17)," 3GPP TR 23.700-20, Jan. 2020, v0.3.0.
WIPO, International Search Report and Written Opinion for International Application No. PCT/CN2020/092681, Feb. 19, 2021.

* cited by examiner

Primary Examiner — Gbemileke J Onamuti
(74) Attorney, Agent, or Firm — Hodgson Russ LLP

(57) ABSTRACT

Methods for wireless communication and a network device are provided. The method includes the following. A first network device determines at least one target terminal device as a GM clock node for multiple TSN clock domains.

19 Claims, 6 Drawing Sheets

200

┌─────────────────────────────────────────────────┐
│ DETERMINE, BY A FIRST NETWORK DEVICE, AT LEAST  │ ⟋ S210
│ ONE TARGET TERMINAL DEVICE AS A GM CLOCK NODE   │
│     FOR MULTIPLE TSN CLOCK DOMAINS              │
└─────────────────────────────────────────────────┘

┌──────────────────────────────────────────────────────────┐
│ TRANSMIT, BY A FIRST DEVICE, FIRST INFORMATION AND/OR    │ ⟋ S310
│ SECOND INFORMATION TO A FIRST NETWORK DEVICE, WHERE THE  │
│ FIRST INFORMATION AND/OR THE SECOND INFORMATION IS USED  │
│ FOR THE FIRST NETWORK DEVICE TO DETERMINE AT LEAST ONE   │
│ TARGET TERMINAL DEVICE AS A GM CLOCK NODE FOR MULTIPLE   │
│   TSN CLOCK DOMAINS, THE FIRST INFORMATION INDICATES     │
│   REFERENCE INFORMATION OF THAT A TERMINAL DEVICE IS     │
│ ASSIGNED AS A GM CLOCK NODE, AND THE SECOND INFORMATION  │
│  INDICATES AT LEAST ONE OF CHANNEL QUALITY INFORMATION,  │
│   LOCATION INFORMATION, OR MOVEMENT INFORMATION OF AT    │
│     LEAST ONE TERMINAL DEVICE IN THE MULTIPLE TSN CLOCK  │
│                         DOMAINS                          │
└──────────────────────────────────────────────────────────┘

RECEIVE, BY A THIRD NETWORK DEVICE, INDICATION INFORMATION OF A FIRST NETWORK DEVICE, WHERE THE INDICATION INFORMATION INDICATES INFORMATION OF A TARGET TERMINAL DEVICE THAT IS DETERMINED BY THE FIRST NETWORK DEVICE AS A GM CLOCK NODE FOR A TSN CLOCK DOMAIN AND/OR THE INDICATION INFORMATION IS USED FOR TRIGGERING THE TARGET TERMINAL DEVICE TO INITIATE AN ESTABLISHMENT OR MODIFICATION PROCEDURE OF A PDU SESSION — S410

INDICATE, BY THE THIRD NETWORK DEVICE, THE TARGET TERMINAL DEVICE TO INITIATE THE ESTABLISHMENT OR MODIFICATION PROCEDURE OF THE PDU SESSION ACCORDING TO THE INDICATION INFORMATION, WHERE THE PDU SESSION IS USED FOR TRANSMISSION OF TSN CLOCK SYNCHRONIZATION INFORMATION, AND THE TARGET TERMINAL DEVICE IS A GM CLOCK NODE FOR AT LEAST ONE TSN CLOCK DOMAIN IN MULTIPLE TSN CLOCK DOMAINS — S420

FIG. 5

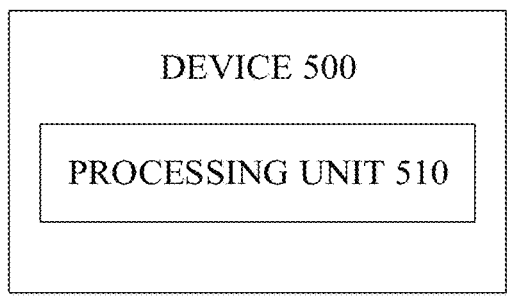

FIG. 6

METHOD FOR WIRELESS COMMUNICATION AND NETWORK DEVICE

CROSS-REFERENCE TO RELATED APPLICATION(S)

This application is a continuation of International Application No. PCT/CN2020/092681, filed May 27, 2020, the entire disclosure of which is incorporated herein by reference.

TECHNICAL FIELD

The disclosure relates to the field of communication, and more particularly to methods for wireless communication and a network device.

BACKGROUND

In a 5$^{th}$ generation (5G) industrial internet of things (IIoT) system, for supporting transmission of services in a 5G system, such as factory automation, transport industry, or electrical power distribution, a concept of time sensitive network (TSN) or time sensitive communication (TSC) is introduced. In a TSN system, a 5G network is assigned as a TSN bridge to provide services for synchronization and service transmission in the TSN system. Therefore, the 5G system needs to provide lower latency guarantee and higher clock synchronization accuracy.

In the 5G system, multiple TSN clock domains can be supported, and each of the multiple TSN clock domains can have a corresponding master clock node that is used for transmission of TSN-synchronization-related information for the clock domain. However, in the 5G system, there are multiple terminal devices, and different terminal devices have different clock accuracy and different local oscillators (LO). In this case, how to select a master clock node for the multiple TSN clock domains to ensure TSN synchronization is an urgent problem to-be-solved.

SUMMARY

Methods for wireless communication and a network device are provided.

In a first aspect, a method for wireless communication is provided. The method includes the following. A first network device determines at least one target terminal device as a grand master (GM) clock node for multiple time sensitive network (TSN) clock domains.

In a second aspect, a method for wireless communication is provided. The method includes the following. A first device transmits first information and/or second information to a first network device. The first information and/or the second information is used for the first network device to determine at least one target terminal device as a GM clock node for multiple TSN clock domains. The first information indicates reference information of that a terminal device is assigned as a GM clock node. The second information indicates at least one of channel quality information, location information, or movement information of at least one terminal device in the multiple TSN clock domains.

In a third aspect, a network device is provided. The network device includes a processor and a memory storing computer programs which, when executed by the processor, cause the processor to determine at least one target terminal device as a GM clock node for multiple TSN clock domains.

BRIEF DESCRIPTION OF THE DRAWINGS

FIG. 3 is a schematic flow chart illustrating a method for wireless communication according to implementations of the disclosure.

FIG. 4 is another schematic flow chart illustrating a method for wireless communication according to implementations of the disclosure.

FIG. 5 is yet another schematic flow chart illustrating a method for wireless communication according to implementations of the disclosure.

FIG. 6 is a schematic block diagram illustrating a device for wireless communication according to implementations of the disclosure.

DETAILED DESCRIPTION

Figure 1:
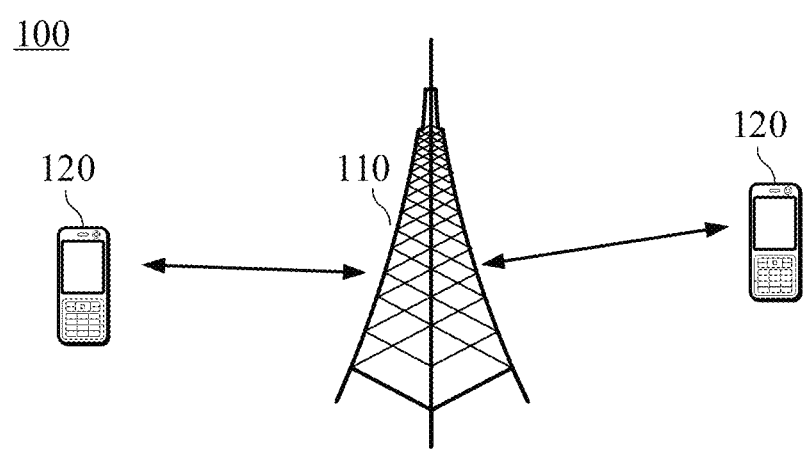
FIG. 1 is a schematic diagram illustrating a communication system architecture provided in implementations of the disclosure.

The following will illustrate technical solutions of implementations of the disclosure with reference to the accompanying drawings of implementations of the disclosure. Apparently, implementations described herein are merely some implementations, rather than all implementations, of the disclosure. Based on the implementations of the disclosure, all other implementations obtained by those of ordinary skill in the art without creative effort shall fall within the protection scope of the disclosure.

The technical solutions in implementations of the disclosure can be applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (WiFi), a 5$^{th}$-generation (5G) system, or other communication systems.

Generally speaking, a conventional communication system supports a limited number of connections and therefore is easy to implement. However, with development of communication technology, a mobile communication system not only supports conventional communication but also supports, for example, device to device (D2D) communication, machine to machine (M2M) communication, machine type communication (MTC), and vehicle to vehicle (V2V) communication. Implementations herein can also be applicable to these communication systems.

Optionally, a communication system in implementations of the disclosure can be applicable to a carrier aggregation (CA) scenario, a dual connectivity (DC) scenario, and a standalone (SA) scenario.

Optionally, the communication system in implementations of the disclosure can be applicable to an unlicensed spectrum, where the unlicensed spectrum can also be regarded as a shared spectrum. Alternatively, the communication system in implementations of the disclosure can also be applicable to a licensed spectrum, where the licensed spectrum can also be regarded as an unshared spectrum.

In implementations of the disclosure, each implementation is illustrated in conjunction with a network device and a terminal device, where the terminal device may also be called a user equipment (UE), an access terminal, a subscriber unit, a subscriber station, a mobile station, a mobile platform, a remote station, a remote terminal, a mobile device, a user terminal, a terminal, a wireless communication device, a user agent, a user apparatus, etc.

The terminal device may also be a station (ST) in the WLAN, a cellular radio telephone, a cordless telephone, a session initiation protocol (SIP) telephone, a wireless local loop (WLL) station, a personal digital assistant (PDA). The terminal equipment may also be a device with wireless communication functions such as a handheld device, a computing device, other processing devices coupled with a wireless modem, an in-vehicle device, a wearable device, or a terminal device in a next-generation communication system such as an NR network, a terminal device in a future evolved public land mobile network (PLMN), etc.

In implementations of the disclosure, the terminal device can be deployed on land, including indoor or outdoor, handheld, wearable, or vehicle-mounted; on water (e.g., a ship); and also in the air (e.g., an aircraft, a balloon, and a satellite).

In implementations of the disclosure, the terminal device may be a mobile phone, a pad, a computer with wireless receiving and transmitting functions, a terminal device for virtual reality (VR), a terminal device for augmented reality (AR), a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, etc.

As an example but not limitation, in implementations of the disclosure, the terminal device may also be a wearable device. The wearable device can also be called a wearable smart device, which is a collective name of wearable devices intelligently designed and developed by applying a wearable technology to daily wear, such as glasses, gloves, watches, clothing, shoes, etc. The wearable device is a portable device that can be worn directly on the body or integrated into clothing or accessories of a user. The wearable device not only is a hardware device but also can realize powerful functions through software support, data interaction, and cloud interaction. Broadly speaking, the wearable smart device includes a device that has full functions and a large size and can realize all or part of functions without relying on a smart phone, e.g., a smart watch, smart glasses, or the like, and includes a device that only focuses on a certain application function and needs to be used with other devices such as a smart phone, e.g., all kinds of smart bracelets for physical sign monitoring, smart jewelry, or the like.

In implementations of the disclosure, the network device may be a device that is used to communicate with a mobile device. The network device may be an access point (AP) in the WLAN, a base transceiver station (BTS) in the GSM or CDMA system, a NodeB (NB) in the WCDMA system, or an evolved NodeB (eNB or eNodeB) in the LTE system. Alternatively, the network device may also be a relay station, an AP, an in-vehicle device, a wearable device, a generation NodeB (gNB) in the NR network, a network device in the future evolved PLMN, or a network device in the NTN network.

As an example but not limitation, in implementations of the disclosure, the network device can have a mobility, e.g., the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, or the like. Alternatively, the network device may also be a base station set on land, on water, or on other locations.

In implementations of the disclosure, the network device can provide a service for a cell, and the terminal device communicates with the network device through transmission resources (e.g., frequency-domain resources or spectrum resources) used by the cell, where the cell may be a cell corresponding to the network device (e.g., a base station). The cell may belong to a macro base station or a base station corresponding to a small cell, where the small cell may include a metro cell, a micro cell, a pico cell, a femto cell, or the like. These small cells have features of small coverage ranges and low transmission power and are suitable for providing high-speed data transmission services.

Exemplarily, a communication system 100 applied in implementations of the disclosure is illustrated in FIG. 1. The communication system 100 may include a network device 110, where the network device 110 can be a device that communicates with a terminal device 120 (or called a communication terminal or a terminal). The network device 110 can provide communication coverage for a specific geographical area and can communicate with terminal devices in the coverage range.

FIG. 1 exemplarily illustrates a network device and two terminal devices. Optionally, the communication system 100 may include multiple network devices, and the other number of terminal devices may be included in a coverage range of each of the multiple network devices, which will not be limited in implementations of the disclosure.

Optionally, the communication system 100 may further include a network controller, a mobility management entity (MME), or other network entities, which will not be limited in implementations of the disclosure.

It can be understood that, a device with a communication function in a network/system in implementations of the disclosure can be called a communication device. Taking the communication system 100 illustrated in FIG. 1 as an example, a communication device may include the network device 110 and the terminal device 120 with the communication function, and the network device 110 and the terminal device 120 can be the above-mentioned specific devices, which will not be repeated herein. The communication device may further include other devices in the communication system 100, e.g., a network controller, an MME, or other network entities, which will not be limited in implementations of the disclosure.

It can be understood that, the terms "system" and "network" in this disclosure are often used interchangeably. The term "and/or" in this disclosure is simply an illustration of an association relationship of associated objects, indicating that three relationships can exist, for example, A and/or B, which can indicate the existence of A alone, A and B together, and B alone. In addition, the character "/" in this disclosure generally indicates that associated objects are in an "or" relationship.

It can be understood that, the "indication" referred to in implementations of the disclosure may be a direct indication, an indirect indication, or an indication indicating an associated relation. For example, A indicates B, which can mean that A indicates B directly, e.g., B can be obtained through A, can also mean that A indicates B indirectly, e.g., A indicates C, and B can be obtained through C, or can further mean that A and B have an associated relation.

In illustration of implementations of the disclosure, the term "correspondence" may represent a direct correspondence or indirect correspondence between the two, may also represent an associated relation between the two, or may further represent a relation of indicating and being indicated, a relation of configuring and being configured, or other relations.

In an industrial internet of things (IIoT) system, for supporting transmission of services in a 5G system, such as factory automation, transport industry, or electrical power distribution, a concept of time sensitive network (TSN) or time sensitive communication (TSC) is introduced. In a TSN system, the communication system 100 is assigned as a TSN bridge to provide services for clock synchronization and service transmission at nodes in the TSN system. Therefore, the communication system 100 needs to provide lower latency guarantee and higher clock synchronization accuracy.

Specifically, in the TSN system, a TSN end station can be connected to the terminal device (scenario 1) or the network device (scenario 2) in the communication system through a TSN translator. For example, as illustrated in FIG. 2, TSN end station 1 is connected to UE 2 through a device-side time sensitive networking translator (DS-TT), and TSN end station 2 is connected to a user plane function (UPF) entity through a network-side time sensitive networking translator (NW-TT).

Figure 2:
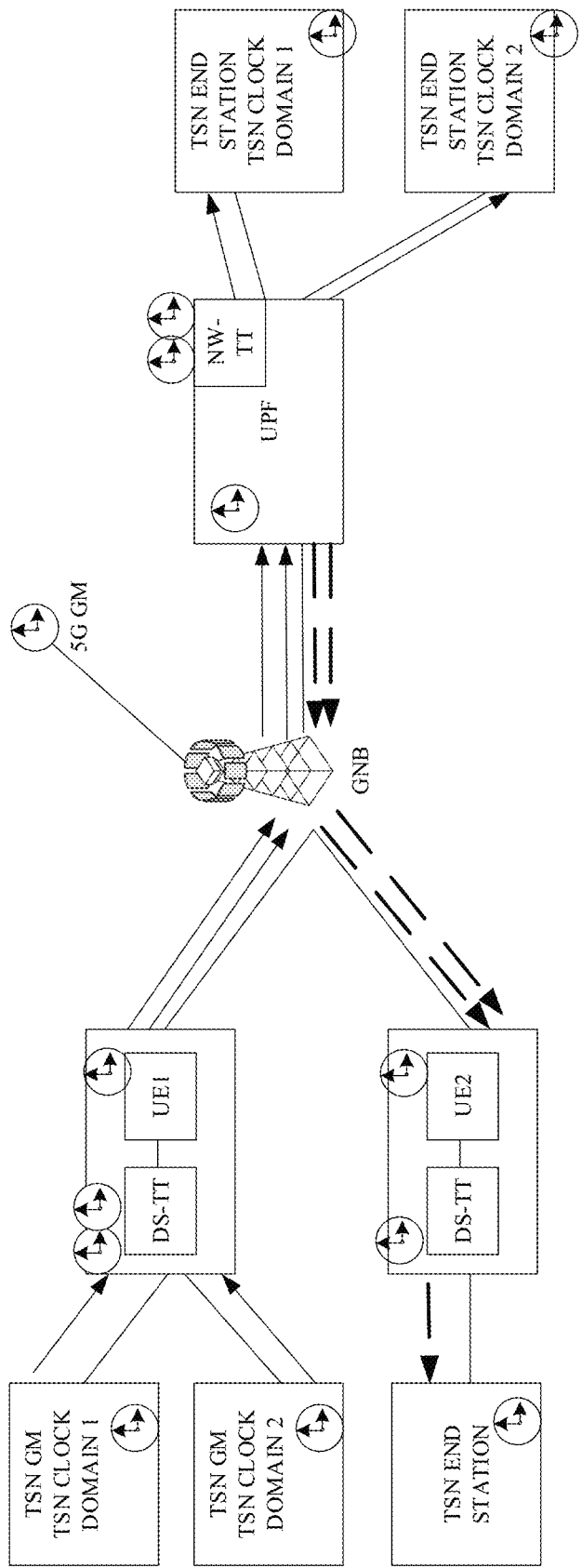
FIG. 2 is another schematic diagram illustrating a communication system architecture provided in implementations of the disclosure.

In conjunction with FIG. 2, clock synchronization procedures in the above two scenarios are illustrated.

In scenario 1: when the TSN end station is connected to the UPF entity, the clock synchronization procedure may include the following.

1. A protocol data unit (PDU) session is established between UE 1 and a network device, where the network device for example may be a gNB, a session management function (SMF) entity, an access and mobility management function (AMF) entity, a UPF entity, a policy control function (PCF) device, or a TSN application function (AF).

2. A master clock node for a TSN clock domain transmits clock synchronization information such as a generic precision time protocol (gPTP) message to the UE 1 through time delay t_1, and clock information is set to T_gm.

3. After the gPTP message arrived, the UE 1 records an arrival time for the gPTP message as T_i with a 5G internal clock, and then transmits the gPTP message to the gNB via an uplink air interface.

4. The gNB transparently transmits the gPTP message to the UPF entity.

5. After receiving the gPTP message, the UPF entity transmits the gPTP message to the TSN end station through time delay t_2, and records a time when the gPTP message leaves the 5G system as T_e with the 5G internal clock.

6. A clock at the TSN end station is updated to T_gm+t_1+t_2+T_e−T_i.

In scenario 2: when the TSN end station is connected to the UE 2, the clock synchronization procedure may include the following.

1. A PDU session is established between the UE 1 and the network device, e.g., a gNB, a UPF, an AMF/SMF/PCF/TSN AF, or other network devices.

2. A master clock node for a TSN clock domain transmits clock synchronization information such as a gPTP message to the UE 1 through time delay t_1, and clock information is set to T_gm.

3. After the gPTP message arrived, the UE 1 records an arrival time for the gPTP message as T_i with a 5G internal clock, and then transmits the gPTP message to the gNB via an uplink air interface.

4. The gNB transparently transmits the gPTP message to the UE 2.

5. After receiving the gPTP message, the UE 2 transmits the gPTP message to the TSN end station through time delay t_2, and records a time when the gPTP message leaves the 5G system as T_e with the 5G internal clock.

6. A clock at the TSN end station is updated to T_gm+t_1+t_2+T_e−T_i.

The communication system can support one or more TSN clock domains. In other words, the communication system 100 can provide services for a TSN system corresponding to the one or more TSN clock domains, e.g., provide services of clock synchronization and service transmission for nodes in the TSN system.

In some implementations, the terminal device can receive the gPTP message and transmit the gPTP message to the DS-TT.

The DS-TT can receive original TSN clock synchronization information for one or more working domains and corresponding ingress timestamping (Tsi) through the gPTP message. Furthermore, the DS-TT generates egress timestamping (TSe) for a gPTP event message for each external TSN working domain. The Tsi and the TSe are determined according to 5G system clocks in the NW-TT and the DS-TT. It should be aware of that, an end station can select interested TSN clock synchronization information according to "domain number" in the gPTP message.

It can be understood that, in implementations of the disclosure, it can be regarded as that one TSN clock domain corresponds to one TSN system, or it can also be regarded as that TSN corresponding to the multiple TSN clock domains constitute one TSN system, which will not be limited herein.

For providing lower latency guarantee and higher clock accuracy, the network device 110 can be assigned as a master TSN clock node, a GM clock node, or a master clock node for a TSN clock domain, and the terminal device 120 can be assigned as a slave TSN clock node for the TSN clock domain, thereby transmitting clock synchronization information for the TSN clock domain through the master clock node and the slave clock node.

In some scenarios, a terminal device can also be assigned as a GM clock node for a TSN clock domain. However, there are multiple terminal devices in a cell in a coverage of a network device, and different terminal devices may have different clock accuracy and different local oscillators (LO). Therefore, which terminal device is selected as a master TSN clock node for a TSN clock domain is an urgent problem to-be-solved.

In view of this, a selection solution for a master clock node for a TSN clock domain is provided in the disclosure, which can solve the above problems.

FIG. 3 is a schematic flow chart illustrating a method 200 for wireless communication according to implementations of the disclosure. The method 200 can be performed by a first network device in a communication system. As illustrated in FIG. 3, the method 200 includes at least part of the following.

At S210, the first network device determines at least one target terminal device as a GM clock node for multiple TSN clock domains.

Optionally, in some implementations, the first network device may be a network device in a communication system, where the communication system may be the communication system 100 in FIG. 1. The communication system can be assigned as a TSN bridge of a TSN system corresponding to the multiple TSN clock domains to provide services for clock synchronization and service transmission at nodes in the TSN system. In other words, the communication system supports the multiple TSN clock domains.

The first network device may be various implementations of the network device 110 in the communication system 100 illustrated in FIG. 1.

For example, the first network device may be an access network device, e.g., a base station.

For another example, the first network device may be a core network device, e.g., an SMF entity, an AMF entity, or a UPF entity.

For yet another example, the first network device may be a network control node, where the network control node may be a network node functioned in management control in a network or a system. Optionally, the network control node may be a network control node in the communication system, e.g., a core network controller (CNC).

Optionally, in other implementations, the first network device may be a network device in a TSN system, e.g., a network control node in the TSN system, where the network control node in the TSN system for example may be a CNC in the TSN system.

It can be understood that, in implementations of the disclosure, the node in the TSN system corresponding to the TSN clock domain may include any one node on a transmission path for TSN clock synchronization information for the TSN clock domain.

For example, as illustrated in FIG. 2, for TSN clock domain 1, when TSN end station 2 is connected to a UPF in a communication system, a PDU session is established between the UPF and UE 1, and a GM clock node for the TSN clock domain 1 can transmit TSN clock synchronization information to the UE 1. Furthermore, the UE 1 can transmit the TSN clock synchronization information to a gNB and the UPF respectively, and then the TSN clock synchronization information is returned to the TSN end station 2 from the UPF, thereby realizing clock synchronization at nodes on the path from the UE 1 to the UPF. In this case, the node in the TSN system corresponding to the TSN clock domain may include but is not limited to at least one of the UE 1, the UPF, or the gNB.

It can be understood that, in implementations of the disclosure, a terminal device in a TSN clock domain may also be a terminal device in the TSN system corresponding to the TSN clock domain, a terminal device involved in the TSN system corresponding to the TSN clock domain, e.g., a terminal device related to a TSN service of the TSN system, or may also be a terminal device in a working domain corresponding to the TSN clock domain, which will not be limited herein.

In implementations of the disclosure, the multiple TSN clock domains include M TSN clock domains, the at least one target terminal device includes N target terminal devices, and the first network device determining the at least one target terminal device as the GM clock node for the multiple TSN clock domains may include at least one of the following.

In case 1, N=1, and the first network device determines one target terminal device as the GM clock node for the multiple TSN clock domains, i.e., GM clock nodes for the multiple TSN clock domains are a same terminal device.

In case 2, N=M, the first network device determines multiple target terminal devices, the multiple target terminal devices are in a one-to-one correspondence with the multiple TSN clock domains, and each of the multiple target terminal devices is assigned as a GM clock node for a corresponding TSN clock domain.

In case 3, N<M, and each of the N target terminal devices is assigned as a GM clock node for at least one TSN clock domain in the M TSN clock domains.

For case 3, as an example, the M TSN clock domains include 4 TSN clock domains that are recorded as TSN clock domain 1~TSN clock domain 4, and the N target terminal devices include 2 terminal devices that are recorded as UE 1 and UE 2. A correspondence between the 4 TSN clock domains and the 2 terminal devices may be the UE 1 being assigned as a GM clock node for the TSN clock domain 1, and the UE 2 being assigned as a GM clock node for the TSN clock domain 2~the TSN clock domain 4, or may also be the UE 1 being assigned as a GM clock node for the TSN clock domain 1 and the TSN clock domain 2, and UE 2 being assigned as a GM clock node for the TSN clock domain 3 and the TSN clock domain 4.

For ease of distinction and illustration, in implementations of the disclosure, the GM clock node for the multiple TSN clock domains is called a high-level GM clock node, and a terminal device assigned as a GM clock node for a TSN clock domain can be called a GM clock UE.

Optionally, in some implementations of the disclosure, the first network device can determine the at least one target terminal device as the GM clock node for the multiple TSN clock domains according to first information and/or second information.

The first information may indicate reference information of that a terminal device is assigned as a GM clock node. For example, the reference information may be capacity-related information of that the terminal device is assigned as a GM clock node, or other information that can be used for auxiliary selection of a GM clock UE, which will not be limited herein.

The second information may indicate at least one of channel quality information, location information (or positioning information), or movement information of a terminal device.

In implementations of the disclosure, the first information and the second information may be newly-added information used for selection of a GM clock UE or may also be existing information, where multiplexing the existing information to select a GM clock UE is beneficial for reducing signaling overhead and improving system performance.

Optionally, in some implementations, the first information or the second information can be obtained from a terminal device.

For example, the first network device is an access network device, and the terminal device can transmit the first information to the first network device through a radio resource control (RRC) message. Optionally, the RRC message may be any one message during RRC connection establishment, e.g., an RRC connection establishment message, an RRC connection reestablishment message, or a user-auxiliary-information message.

For another example, the first network device is a core network device, and the terminal device can transmit the first information to the first network device through a non-access stratum (NAS) message. Optionally, the NAS message may be an NAS message in network registration, a PDU session establishment procedure, or a PDU session modification procedure. That is, the terminal device can transmit the first information to the first network device in network registration, the PDU session establishment procedure, or the PDU session modification procedure, where the first information is transmitted through an existing message or signaling, which is beneficial for reducing signaling overhead and improving system performance.

Optionally, in other implementations, the first information or the second information can be obtained from a second network device.

Optionally, the second network device is a network device related to the first network device, e.g., a device functioned in management control for the first network device, or a device related to services of the first network device.

As some example, the second network device may be one of: a network control node, an SMF entity, an AMF entity, or a UPF entity.

Optionally, the network control node may be a network node functioned in management control in a network or a system. Optionally, the network control node may be a network control node in the communication system, e.g., a CNC, or may also be a network control node in the TSN system, e.g., a CNC in the TSN system. Similarly, the second network device can also obtain the first information and the second information through a similar obtaining manner. For example, the second network device obtains channel quality information of a terminal device through a UE reporting manner. Alternatively, the second network device obtains positioning information or location information of a terminal device through other devices in a communication system, e.g., a positioning entity in the communication system, where the positioning entity for example may be a new radio positioning protocol (NRPP) entity or a location management function (LMF) entity. Furthermore, the second network device transmits the information obtained to the first network device.

Optionally, in some implementations, the second network device may also be the positioning entity, i.e., the first network device can directly obtain the first information through the positioning entity.

In sum up, the manner for the first network device to obtain the first information and the second information is only an example, and the first network device can also obtain the first information and/or the second information through other manners or other devices, which will not be limited herein.

The following will illustrate specific implementations of the first information and the second information in conjunction with above case 1 to case 3, and implementation manners of the target terminal device can be determined according to the first information and/or the second information.

Case 1

In case 1, the first network device can select a same terminal device as the GM clock node (i.e., a high-level GM clock node) for the multiple TSN clock domains, which is beneficial for management of clock nodes by a network device. At the same time, TSN clock synchronization information for the multiple TSN clock domains can be transmitted through the terminal device. Therefore, it is only required to establish one PDU session connection between the terminal device and the network device, which is beneficial for reducing the number of terminal devices that process the TSN clock synchronization information, thereby reducing a processing cost of terminal devices.

Optionally, as an example, the first information may include at least one of: an identifier (ID) of the terminal device; a TSN clock domain number of the terminal device; capacity indication information of the terminal device, where the capacity indication information of the terminal device indicates whether the terminal device has a capacity to be assigned as a GM clock node; or request information of the terminal device, where the request information is indicative of that the terminal device requests to be assigned as a GM clock node.

Optionally, the first information may include an ID of at least one terminal device.

In some implementations, the ID of the at least one terminal device may be an ID of a candidate terminal device that can be assigned as the high-level GM clock node. As an example, the first network device can determine a target terminal device in at least one terminal device corresponding to the ID of the at least one terminal device as the high-level GM clock node.

For example, the first network device can randomly select one of the at least one terminal device as the high-level GM clock node, or select a terminal device corresponding to a minimum ID or a maximum ID as the high-level GM clock node. Alternatively, the first network device can also perform selection in conjunction with other auxiliary information, e.g., in conjunction with other information in the first information, or in conjunction with the second information, which will be illustrated in details below.

Optionally, the ID of the terminal device may be an ID of the terminal device in the TSN system, a flag bit (e.g., a flag) indicative of that the terminal device can be assigned as a GM clock node, or an ID of the terminal device in the communication system, e.g., a radio network temporary identity (RNTI).

Optionally, the first information may include at least one TSN clock domain number.

In some implementation, the at least one TSN clock domain number may be a TSN clock domain number of a candidate terminal device that can be assigned as the high-level GM clock node. As an example, the first network device can determine a target terminal device in at least one candidate terminal device corresponding to the at least one TSN clock domain number as the high-level GM clock node.

For example, the first network device can randomly select one TSN clock domain number in the at least one TSN clock domain number, to assign a terminal device corresponding to the TSN clock domain number as the high-level GM clock node, or select a terminal device corresponding to a minimum TSN clock domain number or a maximum TSN clock domain number as the high-level GM clock node. Alternatively, the first network device can also perform selection in conjunction with other auxiliary information, e.g., in conjunction with other information in the first information, or in conjunction with the second information, which will be illustrated in details below.

Optionally, in some implementations, different TSN clock domain numbers can represent different clock accuracy, e.g., a smaller TSN clock domain number represents higher clock accuracy of a corresponding terminal device. In this case, the first network device can prioritize a terminal device corresponding to a small TSN clock domain number as the high-level GM clock node.

As an implementation, if the first information includes IDs of multiple terminal devices, in this case, the first network device can determine a target terminal device as the high-level GM clock node in further conjunction with TSN clock domain numbers of the multiple terminal devices. For example, a terminal device (i.e., a terminal device with highest clock accuracy) corresponding to a minimum TSN clock domain number in the multiple terminal devices is determined as the high-level GM clock node.

As another implementation, the first information includes an ID of a terminal device, but the number of terminal devices corresponding to the ID is multiple. In this case, the first network device can also determine a terminal device as the high-level GM clock node in further conjunction with TSN clock domain numbers of the multiple terminal devices. For example, a terminal device (i.e., a terminal device with highest clock accuracy) corresponding to a minimum TSN clock domain number in the multiple terminal devices is determined as the high-level GM clock node.

In some implementations, a TSN clock domain number indicated by the first information may be a number of a master clock domain in the multiple TSN clock domains. In other words, a TSN clock domain number of the target terminal device can be regarded as a master clock domain number. In some implementations, it can be regarded as that a terminal device corresponding to the master clock domain number has relatively high clock accuracy and can be assigned as a candidate high-level GM clock node. Therefore, in some scenarios, if a terminal device that is currently assigned as a high-level GM clock node is required to be changed, a next terminal device to be assigned as the high-level GM clock node can be selected in terminal devices corresponding to the master clock domain number.

In some implementations, the capacity indication information of the terminal device for example may include at least one of: whether the terminal device supports a high precision clock, clock accuracy supported by the terminal device, whether the terminal device has a capacity to be assigned as a GM clock node for a TSN clock domain, whether the terminal device has a capacity to be assigned as the GM clock node for the multiple TSN clock domains, or whether the terminal device has a capacity to be assigned as a GM clock node for a specific TSN clock domain in the multiple TSN clock domains.

Optionally, the capacity indication information of the terminal device may include first capacity indication information, where the first capacity indication information indicates whether the terminal device supports a high precision clock. For example, the first capacity indication information includes a bit, where a value of the bit is used to represent whether the terminal device supports a high precision clock. As an example, the value of the bit being 1 represents that the terminal device supports the high precision clock, and the value of the bit being 0 represents that the terminal device does not support the high precision clock.

Optionally, the capacity indication information of the terminal device may include second capacity indication information, where the second capacity indication information indicates clock accuracy supported by the terminal device. Specifically, a value of the second capacity indication information is used to represent clock accuracy supported by the terminal device. Supposing that there are four types of clock accuracy, e.g., high clock accuracy, second-highest clock accuracy, medium clock accuracy, and low clock accuracy, the second capacity indication information may include 2 bits, where values of the 2 bits are used to represent the four types of clock accuracy.

Optionally, the capacity indication information of the terminal device may include third capacity indication information, where the third capacity indication information indicates whether the terminal device has a capacity to be assigned as a GM clock node. For example, the third capacity indication information includes a bit, where a value of the bit is used to represent whether the terminal device has a capacity to be assigned as a GM clock node. As an example, the value of the bit being 1 represents that the terminal device has the capacity to be assigned as a GM clock node, and the value of the bit being 0 represents that the terminal device does not have the capacity to be assigned as a GM clock node.

Optionally, the capacity indication information of the terminal device may include fourth capacity indication information, where the fourth capacity indication information indicates whether the terminal device has a capacity to be assigned as a high-level GM clock node. For example, the fourth capacity indication information includes a bit, where a value of the bit is used to represent whether the terminal device has a capacity to be assigned as a high-level GM clock node. As an example, the value of the bit being 1 represents that the terminal device has the capacity to be assigned as a high-level GM clock node, and the value of the bit being 0 represents that the terminal device does not have the capacity to be assigned as a high-level GM clock node.

Optionally, the capacity indication information of the terminal device may include fifth capacity indication information, where the fifth capacity indication information indicates whether the terminal device has a capacity to be assigned as a GM clock node for a specific TSN clock domain.

In some implementations, the fifth capacity indication information may indicate, through bit mapping, whether the terminal device has a capacity to be assigned as a GM clock node for a specific TSN clock domain. For example, the fifth capacity indication information may include multiple bits, where each of the multiple bits corresponds to one of the multiple TSN clock domains, and each bit indicates whether the terminal device has a capacity to be assigned as a GM clock node for a corresponding TSN clock domain.

For example, the multiple TSN clock domains include 4 TSN clock domains, and the fifth capacity indication information of the terminal device may include 4 bits that respectively correspond to the 4 TSN clock domains. A value of each of the 4 bits indicates whether the terminal device has a capacity to be assigned as a GM clock node for a corresponding TSN clock domain, where the value of each bit being 1 is supposed to represent that the terminal device has the capacity to be assigned as a GM clock node for the TSN clock domain, and the value of each bit being 0 is supposed to represent that the terminal device does not have the capacity to be assigned as a GM clock node for the TSN clock domain. As a specific example, values of the 4 bits being 0001, which respectively correspond to TSN clock domain 3~TSN clock domain 0, represent that the terminal device has a capacity to be assigned as a GM clock node for the TSN clock domain 0.

It can be understood that, the above indication manners of the capacity indication information of the terminal device are only examples and may not constitute any limitation to the disclosure, and the capacity indication information of the terminal device can also be indicated through other manners, which will not be limited herein.

In some implementations of the disclosure, a terminal device assigned as a high-level GM clock node needs to transmit TSN clock synchronization information for multiple TSN clock domains, therefore, relatively high clock accuracy is needed. Therefore, the first network device can prioritize a terminal device that supports a high precision clock or has a capacity to be assigned as a high-level GM clock node as the high-level GM clock node.

Optionally, the request information of the terminal device may include at least one of: first request information indicative of that the terminal device requests to be assigned as a GM clock node for a TSN clock domain, second request information indicative of that the terminal device requests to be assigned as the GM clock node for the multiple TSN clock domains, or third request information indicative of that the terminal device requests to be assigned as a GM clock node for a specific TSN clock domain in the multiple TSN clock domains.

Optionally, the first request information includes a bit, where a value of the bit is used to represent whether the terminal device requests to be assigned as a GM clock node. As an example, the value of the bit being 1 represents that the terminal device requests to be assigned as a GM clock node, and the value of the bit being 0 represents that the terminal device does not request to be assigned as a GM clock node.

Optionally, the second request information includes a bit, where a value of the bit is used to represent whether the terminal device requests to be assigned as the high-level GM clock node. As an example, the value of the bit being 1 represents that the terminal device requests to be assigned as the high-level GM clock node, and the value of the bit being 0 represents that the terminal device does not request to be assigned as the high-level GM clock node.

Optionally, the third request information may indicate, through bit mapping, that the terminal device requests to be assigned as a GM clock node for which TSN clock domain. For example, the third request information may include multiple bits, where each of the multiple bits corresponds to one TSN clock domain among the multiple TSN clock domains, and each bit indicates whether the terminal device requests to be assigned as a GM clock node for the TSN clock domain.

For example, the multiple TSN clock domains include 4 TSN clock domains, and the third request information of the terminal device may include 4 bits that respectively correspond to the 4 TSN clock domains. A value of each of the 4 bits indicates whether the terminal device requests to be assigned as a GM clock node for a corresponding TSN clock domain, where the value of each bit being 1 is supposed to represent that the terminal device requests to be assigned as a GM clock node for the TSN clock domain, and the value of each bit being 0 is supposed to represent that the terminal device does not request to be assigned as a GM clock node for the TSN clock domain. As a specific example, values of the 4 bits being 0001, which respectively correspond to TSN clock domain 3~TSN clock domain 0, represent that the terminal device requests to be assigned as a GM clock node for the TSN clock domain 0.

It is to be noted that, in implementations of the disclosure, the first network device can also determine a target terminal device as a high-level GM clock node according to one of the above information, or in other implementations, the first network device can also determine the target terminal device in conjunction with at least two information in the above information.

As an example, if the first information includes request information of multiple terminal devices, each of the multiple terminal devices requests to be assigned as a high-level GM clock node, and the first network device can determine to select which of the multiple terminal device as a high-level GM clock node in conjunction with at least one of capacity indication information, TSN clock domain numbers, or IDs of the multiple terminal devices.

For example, the first network device can assign a terminal device as the high-level GM clock node, where the terminal device is a terminal device with highest clock accuracy in the multiple terminal devices, a terminal device supporting a high precision clock, a specific precision, or a specific clock or clock accuracy, or a terminal device having a capacity to be assigned as a high-level GM clock node.

For another example, the first network device can assign a terminal device (i.e., a terminal device with highest clock accuracy) corresponding to a minimum TSN clock domain number in the multiple terminal devices as the high-level GM clock node.

For yet another example, the first network device can select from among the multiple terminal devices a terminal device having a specific terminal device ID as the GM clock node. The specific terminal device ID may be a maximum terminal device ID or a minimum terminal device ID.

In a word, the target terminal device determined according to the first information may satisfy one of: the target terminal device being a terminal device corresponding to an ID of the terminal device indicated by the first information, the target terminal device being a terminal device corresponding to a TSN clock domain number indicated by the first information, the target terminal device supporting a high precision clock, the target terminal device having a capacity to be assigned as a GM clock node for a TSN clock domain, the target terminal device having a capacity to be assigned as the GM clock node for the multiple TSN clock domains, the target terminal device having a capacity to be assigned as a GM clock node for a specific TSN clock domain in the multiple TSN clock domains, the target terminal device requesting to be assigned as a GM clock node for a TSN clock domain, the target terminal device requesting to be assigned as the GM clock node for the multiple TSN clock domains, the target terminal device requesting to be assigned as a GM clock node for the specific TSN clock domain in the multiple TSN clock domains.

Optionally, in some implementations of the disclosure, the second information may include at least one of: a measurement result of a measurement reference signal measured by the at least one terminal device; a measurement result of a measurement reference signal measured by the at least one terminal device in a period; the movement information of the at least one terminal device, in other words, a movement condition of the at least one terminal device in a period; or the location information of the at least one terminal device.

Therefore, a channel quality and/or movement condition of a terminal device can be determined according to the second information.

Optionally, in the second information the measurement result of the measurement reference signal measured by a terminal device may be existing measurement reporting information of the terminal device. Selection of a GM clock UE is assisted by using measurement reporting information of a terminal device, which can improve resource utilization and a system performance.

Optionally, the measurement result for example may be but is not limited to: a reference signal receiving power (RSRP), a reference signal receiving quality (RSRQ), or a signal to interference plus noise ratio (SINR).

Optionally, in some implementations, the at least one terminal device may be at least one terminal device in the multiple TSN clock domains, at least one terminal device in the communication system, or at least one terminal device assigned as a node for the TSN system and the communication system.

Optionally, the target terminal device determined by the first network device according to the second information satisfies at least one of: the target terminal device being a terminal device that has a channel quality higher than a first threshold in the at least one terminal device, the target terminal device being a terminal device that has a channel quality higher than a second threshold in a period in the at least one terminal device, the target terminal device being a terminal device moved in a specific range, or the target terminal device being a terminal device currently located in the specific range.

It can be understood that, in implementations of the disclosure, the target terminal device being moved in the specific range can be regarded as that the terminal device has a low mobility.

Optionally, as an example, the specific range may be a network coverage of the communication system, a coverage range of a certain network device, a coverage range of a certain cell, or a certain area in a coverage of a cell or a network device.

It can be understood that, when a terminal device is moved out of a coverage range of a network, a PDU session between the terminal device and a network device is required to be reestablished, such that transmission of TSN clock synchronization information can be performed. In the disclosure, by selecting a terminal device that has a good channel quality and a low mobility as a high-level GM clock node, it is beneficial for avoiding repeated establishment of a PDU session due to movement of the terminal device, thereby saving system resources and improving a system performance.

It can be understood that, the first network device can determine a target terminal device as the high-level GM clock node according to only the first information or only the second information. In other implementations, the first network device can also determine the target terminal device in conjunction with the first information and the second information, which will not be limited in implementations of the disclosure.

As an example, if there are multiple terminal devices determined to have a capacity to be assigned as a high-level GM clock node according to the first information, the first network device can select from among the multiple terminal devices a terminal device having an optimal channel quality as a high-level GM clock node, or select from among the multiple terminal devices a terminal device having an optimal channel quality and a low mobility as a high-level GM clock node.

As another example, if there are multiple terminal device determined to request to be assigned as a high-level GM clock node according to the first information, the first network device can select from among the multiple terminal devices a terminal device having an optimal channel quality as a high-level GM clock node, or select from among the multiple terminal devices a terminal device having an optimal channel quality and a low mobility as a high-level GM clock node.

As yet another example, if the first information includes IDs of multiple terminal devices, in this case, the first network device can determine a target terminal device as a high-level GM clock node in further conjunction with location information of the multiple terminal devices. For example, a terminal device that is moved in the specific range or has a low mobility in the multiple terminal devices is determined as the high-level GM clock node.

Therefore, in the disclosure, by selecting a terminal device as a high-level GM clock node in conjunction with a capacity of the terminal device, a channel quality of the terminal device, and a mobility of the terminal device, it is beneficial for ensuring reliable transmission of TSN clock synchronization information, and avoiding waste of system resources due to repeated establishment of a PDU session.

Furthermore, in some implementations of the disclosure, after the target terminal device is determined as the high-level GM clock node, the first network device can also indicate the target terminal device to initiate a PDU establishment or modification procedure, to transmit TSN clock synchronization information.

For example, the target terminal device can transmit a PDU session establishment request to establish a PDU session, and can further transmit TSN clock synchronization information for the multiple TSN clock domains through the PDU session.

Optionally, the TSN clock synchronization information can be carried in a gPTP message.

Optionally, in some implementations, the target terminal device can also be used for transmission of TSN service information.

In some implementations of the disclosure, the PDU session has a reservation ID, and the reservation ID can be used to determine whether a terminal device corresponding to the PDU session is a high-level GM clock node or that the PDU session can carry TSN clock synchronization information. In other words, the PDU session with the reservation ID is a PDU session used for transmission of TSN clock synchronization information. In addition, furthermore, the PDU session can also be used for transmission of corresponding TSN service information.

In other implementations of the disclosure, after the first network device determines the target terminal device as the high-level GM clock node, the first network device can further transmit indication information to a third network device, to indicate the third network device to trigger the target terminal device to initiate a PDU session establishment procedure. That is, the PDU session establishment procedure of the target terminal device may be triggered by the first network device or the third network device.

Optionally, in some implementations, the indication information indicates information of a target terminal device that is determined by the first network device as the high-level GM clock node and/or information for triggering the target terminal device to initiate a PDU session establishment procedure.

Optionally, the third network device may be one of: an access network device, a network control node, an SMF entity, an AMF entity, or a UPF entity.

In some scenarios, if a terminal device that is assigned as a high-level GM clock node is required to be changed, the first network device can indicate the terminal device currently assigned as the high-level GM clock node (recorded as a first terminal device) to release a PDU session that is used for transmission of TSN clock synchronization information, such as the above PDU session with the reservation ID. Furthermore, the first network device can indicate a terminal device (recorded as a second terminal device) to initiate a PDU session establishment request, to establish a new PDU session for transmission of the TSN clock synchronization information, where the second terminal device is a next terminal device to be assigned as the high-level GM clock node.

Optionally, in some implementations of the disclosure, according to at least one of a channel quality, an operating state, or a movement condition of at least one terminal device in the multiple TSN clock domains, the first network device can determine whether to change the terminal device that is assigned as the high-level GM clock node.

Optionally, the first network device can determine to change the terminal device that is assigned as the high-level GM clock node, upon satisfying at least one of: the at least one terminal device including a terminal device that has a channel quality higher than a channel quality of the first terminal device, the first terminal device being in a power failure or an abnormal operation, or the first terminal device being moved out of a specific range.

Optionally, the specific range is a network coverage of the communication system, a coverage range of a certain network device, or a coverage range of a certain cell.

Optionally, in some implementations of the disclosure, the next terminal device to be assigned as the high-level GM clock node can be determined according to third information and/or first indication information of a second network device.

Optionally, for a content of the third information, reference can be made to the content of the second information above, which will not be repeated for sake of simplicity.

Optionally, in some implementations, the first indication information of the second network device is the content of the first information above, which will not be repeated for sake of simplicity.

Furthermore, for a manner for determining a next terminal device as a high-level GM clock node according to the third information and/or the indication information, reference can be made to the implementation manner for determining a target terminal device as a high-level GM clock node according to the first information and/or the second information in the foregoing implementations, which will not be repeated for sake of simplicity.

As an example, the second terminal device may be a terminal device that has a channel quality higher than a channel quality of the first terminal device.

As another example, the second terminal device may be a terminal device that has a high channel quality and a low mobility.

As yet another example, a TSN clock domain number of the second terminal device is the same as a TSN clock domain number of the first terminal device. The TSN clock domain number of the first terminal device can represent high clock accuracy, where selection of a terminal device that has the same TSN clock domain number as the first network device is beneficial for ensuring high clock accuracy in a TSN clock domain.

The above specifically illustrates in case 1, the manner for selecting a target terminal device as a high-level GM clock node, and how to select a next target terminal device if a terminal device assigned as a high-level GM clock node is required to be changed.

In conjunction with case 2 and case 3, the following will respectively illustrate a manner for selecting a target terminal device as a GM clock node for part of the multiple TSN clock domains, and if a GM clock node for a certain TSN clock domain is required to be changed, how to select a next target terminal device as a target GM clock node for the TSN clock domain.

Case 2

In case 2, the first network device can select one target terminal device as a GM clock node for each of the multiple TSN clock domains, such that TSN clock synchronization information for each TSN clock domain can be transmitted through a corresponding target terminal device.

The following will take determination of a target terminal device that is to be assigned as a GM clock node for a first TSN clock domain in the multiple TSN clock domains as an example for illustration, which is similar to manners for determining GM clock nodes for other TSN clock domains, where the manners will not be repeated herein for sake of simplicity.

Optionally, in case 2, the first network device can also determine a target terminal device as a GM clock node for the first TSN clock domain according to first information and/or second information.

Optionally, for specific contents of the first information and the second information, reference can be made to the illustration of the first information and the second information in case 1, which will not be repeated herein for sake of simplicity.

Furthermore, for a manner for determining a GM clock node for the first TSN clock domain according to the first information and/or the second information, reference can be made to the related illustration in case 1, which will not be repeated herein for sake of simplicity.

Specially, in case 2, since the first network device aims to select a target terminal device as a GM clock node for the first TSN clock domain, optionally, the first network device can prioritize a terminal device that has a capacity to be assigned as the GM clock node for the first TSN clock domain or a terminal device that requests to be assigned as the GM clock node for the first TSN clock domain as the GM clock node for the first TSN clock domain. The first network device can also use the manner for selecting a high-level GM clock node in case 1 to select a target terminal device as the GM clock node for the first TSN clock domain, which will not be limited herein.

Furthermore, after determining a target terminal device (supposed to be a first terminal device) as the GM clock node for the first TSN clock domain, the first network device can also trigger the first terminal device to initiate an establishment procedure of a PDU session, where the PDU session is used for at least transmission of TSN clock synchronization information for the first TSN clock domain.

Optionally, the PDU session can also be used for transmission of TSN clock synchronization information for other TSN clock domains (e.g., TSN clock domains with higher clock accuracy).

Optionally, the TSN clock synchronization information for the first TSN clock domain can be carried in a gPTP message.

Optionally, the first terminal device or the PDU session can also be used for transmission of TSN service information.

In other implementations, as illustrated in case 1, the first terminal device initiating the establishment procedure of the PDU session may be triggered by the first network device or a third network device. For specific triggering manners, reference can be made to the related illustration in case 1, which will not be limited herein for sake of simplicity.

In case 2, the PDU session can also have a reservation ID, and the reservation ID can be used to determine whether a terminal device corresponding to the PDU session is the GM clock node for the first TSN clock domain or that the PDU session can carry the TSN clock synchronization information for the first TSN clock domain. In other words, the PDU session with the reservation ID is a PDU session used for transmission of the TSN clock synchronization information for the first TSN clock domain.

Optionally, the PDU session may also correspond to a TSN clock domain number that is used to represent that the PDU session is a PDU session used for transmission of TSN synchronization information for which TSN clock domain.

In some scenarios, if a terminal device that is assigned as the GM clock node for the first TSN clock domain is required to be changed, the first network device can indicate the first terminal device to release a PDU session that is used for transmission of TSN clock synchronization information. Furthermore, the first network device can indicate a terminal device (recorded as a second terminal device) to initiate a PDU session establishment request or a PDU session modification procedure, to transmit the TSN clock synchronization information for the first TSN clock domain, where the second terminal device is a next terminal device to be assigned as the GM clock node for the first TSN clock domain.

Optionally, in some implementations of the disclosure, according to at least one of a channel quality, an operating state, or a movement condition of at least one terminal device in the multiple TSN clock domains, the first network device can determine whether to change the terminal device that is assigned as the GM clock node for the first TSN clock domain.

Optionally, the first network device can determine to change the terminal device that is assigned as the GM clock node for the first TSN clock domain, upon satisfying at least one of: the at least one terminal device including a terminal device that has a channel quality higher than a channel quality of the first terminal device, the first terminal device being in a power failure or an abnormal operation, or the first terminal device being moved out of a specific range.

Optionally, the specific range is a network coverage of the communication system, a coverage range of a certain network device, or a coverage range of a certain cell.

Optionally, in some implementations of the disclosure, the next terminal device to be assigned as the high-level GM clock node can be determined according to third information and/or first indication information of a second network device.

Optionally, in case 2, a content of the third information can include the content of the second information above, which will not be repeated for sake of simplicity.

Furthermore, optionally, the third information can also include information of a GM clock node for another TSN clock domain in the multiple TSN clock domains except the first TSN clock domain.

Optionally, in some implementations, the first indication information of the second network device is the content of the first information above, which will not be repeated for sake of simplicity.

Furthermore, for a manner for determining a next terminal device as a high-level GM clock node according to the third information and/or the indication information, reference can be made to the implementation manner for determining a target terminal device as a high-level GM clock node according to the first information and/or the second information in the foregoing implementations, which will not be repeated for sake of simplicity.

As an example, the second terminal device may be a terminal device that has a channel quality higher than a channel quality of the first terminal device.

As another example, the second terminal device may be a terminal device that has a high channel quality and a low mobility.

As yet another example, a TSN clock domain number of the second terminal device is the same as a TSN clock domain number of the first terminal device. The TSN clock domain number of the first terminal device can represent high clock accuracy, where selection of a terminal device that has the same TSN clock domain number as the first network device is beneficial for ensuring high clock accuracy in a TSN clock domain.

In case 2, the second terminal device may be a terminal device that is assigned as a GM clock node for another TSN clock domain in the multiple TSN clock domains except the first TSN clock domain. A PDU session connection has been already established between the terminal device and the network device, where the PDU session connection is used for transmission of TSN clock synchronization information for the other TSN clock domain.

Optionally, a PDU session, which is used for transmission of TSN clock synchronization information and established between the network device and the terminal device that is assigned as the GM clock node for the other TSN clock domain, can also correspond to a reservation ID. The reservation ID is used to determine that the terminal device corresponding to the PDU session is the GM clock node for the other TSN clock domain or that the PDU session is used for transmission of the TSN clock synchronization information for the other TSN clock domain.

It can be understood that, in implementations of the disclosure, PDU sessions used for transmission of TSN clock synchronization information for different TSN clock domains can correspond to a same reservation ID. Furthermore, other information of the PDU session, e.g., a TSN clock domain number, can be used to determine a TSN clock domain, where TSN clock synchronization information for the TSN clock domain is transmitted by using the PDU session Alternatively, the PDU sessions used for transmission of TSN clock synchronization information for different TSN clock domains can also correspond to different reservation IDs. By means of different reservation IDs, a TSN clock domain can be determined, where TSN clock synchronization information for the TSN clock domain is transmitted by using the PDU session.

The first network device selects a terminal device, from among the terminal devices that can be assigned as the GM clock node for the other TSN clock domain, as the GM clock node for the first TSN clock domain. The first network device can use a PDU session connection that has been already established between the terminal device and a network device, to transmit TSN clock synchronization information for the two TSN clock domains.

Specifically, the second terminal device may not need to reinitiate the establishment procedure of the PDU session but may just need to initiate a modification procedure of the PDU session, to modify the PDU session to be used for transmission of the TSN clock synchronization information for the two TSN clock domains. For example, modify a TSN clock domain number of the PDU session to correspond to the two TSN clock domains.

In implementations of the disclosure, if a terminal device assigned as a GM clock node for a certain TSN clock domain is required to be changed, a terminal device assigned as a GM clock node for another TSN clock domain is selected as the GM clock node for the TSN clock domain. As such, it is beneficial for the network device to manage clock nodes, and it is beneficial for avoiding resource waste due to establishment of multiple PDU sessions and reducing the number of terminal devices that process TSN clock synchronization information, thereby reducing a processing cost of terminal devices.

As an example, the multiple TSN clock domains include TSN clock domain 1 and TSN clock domain 2. A master clock node for the TSN clock domain 1 is UE 1, PDU session 1 is established between the UE 1 and a network device, and the UE 1 transmits gPTP message 1 through the PDU session 1. A master clock node for the TSN clock domain 2 is UE 2, PDU session 2 is established between the UE 2 and a network device, and the UE 2 transmits gPTP message 2 through the PDU session 2. If the UE 1 is in a power failure, the master clock node for the TSN clock domain 1 can be changed to the UE 2. Furthermore, the UE 2 can initiate a PDU session modification request, to modify the PDU session 2 to transmit the gPTP message 1 and the gPTP message 2. For example, a TSN clock domain number of the PDU session 2 can be modified to correspond to the TSN clock domain 1 and the TSN clock domain 2.

As another example, the multiple TSN clock domains include TSN clock domain 1 and TSN clock domain 2. A master clock node for the TSN clock domain 1 is UE 1, PDU session 1 is established between the UE 1 and a network device, and the UE 1 transmits gPTP message 1 through the PDU session 1. A master clock node for the TSN clock domain 2 is UE 2, PDU session 2 is established between the UE 2 and a network device, and the UE 2 transmits gPTP message 2 through the PDU session 2. If the UE 1 and the UE 2 are in a power failure, the master clock nodes for the TSN clock domain 1 and the TSN clock domain 2 can be changed to UE 3, where no PDU session connection is established between the UE 3 and a network device. Furthermore, the UE 3 can initiate a PDU session establishment request, to establish PDU session 3 to transmit the gPTP message 1 and the gPTP message 2. For example, a TSN clock domain number of the PDU session 3 can be modified to correspond to the TSN clock domain 1 and the TSN clock domain 2.

In Case 3

In case 3, the first network device can determine the N target terminal devices as GM clock nodes for the M TSN clock domains, where N<M.

Each of the N target terminal devices corresponds to at least one TSN clock domain, i.e., each target terminal device is assigned as a GM clock node for at least one TSN clock domain.

That is to say, in case 3, one terminal device can be assigned as a GM clock node for multiple TSN clock domains, one terminal device can also be assigned as a GM clock node for one TSN clock domain, or one terminal device can be assigned as a GM clock node for multiple TSN clock domains that are part of the M TSN clock domains.

It can be understood that, in case 3, for implementation manners of selecting the N target terminal devices for the M TSN clock domains by the first network device, reference can be made to the related implementations in foregoing case 1 and case 2, which will not be repeated herein for sake of simplicity.

FIG. 4 is a schematic flow chart illustrating a method 300 for wireless communication according to implementations of the disclosure. As illustrated in FIG. 4, the method 300 includes at least part of the following.

At S310, a first device transmits first information and/or second information to a first network device. The first information and/or the second information is used for the first network device to determine at least one target terminal device as a GM clock node for multiple TSN clock domains. The first information indicates reference information of that a terminal device is assigned as a GM clock node. The second information indicates at least one of channel quality information, location information, or movement information of at least one terminal device in the multiple TSN clock domains.

Optionally, the first device may be a terminal device or a second network device. For specific implementations of transmitting the first information and/or the second information to the first network device by the terminal device and the second network device, reference can be made to the related illustration in the FIG. 3, which will not be repeated herein for sake of simplicity.

Optionally, in some implementations, the at least one target terminal device is used to transmit TSN clock synchronization information for the multiple TSN clock domains, and the TSN clock synchronization information is used for synchronization of clocks at nodes in the multiple TSN clock domains.

Optionally, in some implementations, the TSN clock synchronization information is carried in a gPTP message.

Optionally, in some implementations, the first information includes at least one of: an ID of the terminal device; a TSN clock domain number of the terminal device; capacity indication information of the terminal device, where the capacity indication information of the terminal device indicates whether the terminal device has a capacity to be assigned as a GM clock node; or request information of the terminal device, where the request information is indicative of that the terminal device requests to be assigned as a GM clock node.

Optionally, in some implementations, the capacity indication information of the terminal device includes at least one of: whether the terminal device supports a high precision clock, clock accuracy supported by the terminal device, whether the terminal device has a capacity to be assigned as a GM clock node for a TSN clock domain, whether the terminal device has a capacity to be assigned as the GM clock node for the multiple TSN clock domains, or whether the terminal device has a capacity to be assigned as a GM clock node for a specific TSN clock domain in the multiple TSN clock domains.

Optionally, in some implementations, the request information of the terminal device includes at least one of: information indicative of that the terminal device requests to be assigned as a GM clock node for a TSN clock domain, information indicative of that the terminal device requests to be assigned as the GM clock node for the multiple TSN clock domains, or information indicative of that the terminal device requests to be assigned as a GM clock node for a specific TSN clock domain in the multiple TSN clock domains.

Optionally, in some implementations, the second information includes at least one of: a measurement result of a measurement reference signal measured by the at least one terminal device, a measurement result of a measurement reference signal measured by the at least one terminal device in a period, the movement information of the at least one terminal device, or the location information of the at least one terminal device.

Optionally, in some implementations, the multiple TSN clock domains include M TSN clock domains, and the at least one target terminal device includes N target terminal devices. A relation between the M TSN clock domains and the N target terminal devices includes one of: N=1, and the one target terminal device being assigned as a GM clock node for each of the M TSN clock domains; N=M, the M TSN clock domains being in a one-to-one correspondence with the N target terminal devices, and each of the N target terminal devices being assigned as a GM clock node for a corresponding TSN clock domain; or N<M, and each of the N target terminal devices being assigned as a GM clock node for at least one TSN clock domain in the M TSN clock domains.

Optionally, in some implementations, the target terminal device satisfies one of: the target terminal device being a terminal device corresponding to an ID of the terminal device indicated by the first information, the target terminal device being a terminal device corresponding to a TSN clock domain number indicated by the first information, the target terminal device supporting a high precision clock, the target terminal device having a capacity to be assigned as a GM clock node for a TSN clock domain, the target terminal device having a capacity to be assigned as the GM clock node for the multiple TSN clock domains, the target terminal device having a capacity to be assigned as a GM clock node for a specific TSN clock domain in the multiple TSN clock domains, the target terminal device requesting to be assigned as a GM clock node for a TSN clock domain, the target terminal device requesting to be assigned as the GM clock node for the multiple TSN clock domains, the target terminal device requesting to be assigned as a GM clock node for the specific TSN clock domain in the multiple TSN clock domains, the target terminal device being a terminal device that has a channel quality higher than a first threshold in the at least one terminal device, the target terminal device being a terminal device that has a channel quality higher than a second threshold in a period in the at least one terminal device, the target terminal device being a terminal device moved in a specific range, or the target terminal device being a terminal device located in the specific range.

Optionally, in some implementations, the first device is a terminal device or a second network device.

Optionally, in some implementations, the terminal device transmits the first information to the first network device through an NAS message.

Optionally, in some implementations, the NAS message is an NAS message in network registration or a PDU session establishment procedure.

Optionally, in some implementations, the second network device is one of: a network control node, an SMF entity, an AMF entity, or a UPF entity.

Optionally, in some implementations, the first network device is one of: an access network device, an SMF entity, an AMF entity, a UPF entity, or a network control node in a communication system, where the communication system provides services to a TSN system corresponding to the multiple TSN clock domains.

Optionally, in some implementations, the network control node is a network control node in the communication system or the TSN system.

FIG. 5 is a schematic flow chart illustrating a method 400 for wireless communication according to implementations of the disclosure. As illustrated in FIG. 5, the method 400 includes at least part of the following.

At S410, a third network device receives indication information of a first network device. The indication information indicates information of a target terminal device that is determined by the first network device as a GM clock node for a TSN clock domain and/or the indication information is used for triggering the target terminal device to initiate an establishment or modification procedure of a PDU session.

At S420, the third network device indicates the target terminal device to initiate the establishment or modification procedure of the PDU session according to the indication information. The PDU session is used for transmission of TSN clock synchronization information, and the target terminal device is a GM clock node for at least one TSN clock domain in multiple TSN clock domains.

It can be understood that, the third network device herein can correspond to the third network device in the implementations illustrated in FIG. 3. For specific implementations, reference can be made to the related illustration in the implementations illustrated in FIG. 3, which will not be repeated herein for sake of simplicity.

Optionally, in some implementations, the target terminal device is used to transmit TSN clock synchronization information for the at least one TSN clock domain, and the TSN clock synchronization information is used for synchronization of a clock at a node in the at least one TSN clock domain.

Optionally, in some implementations, the TSN clock synchronization information is carried in a gPTP message.

Optionally, in some implementations, the target terminal device according to first information and/or second information, the first information indicates reference information of that a terminal device is assigned as a GM clock node, and the second information indicates at least one of channel quality information, location information, or movement information of at least one terminal device in the multiple TSN clock domains.

Optionally, in some implementations, the first information includes at least one of: an ID of the terminal device; a TSN clock domain number of the terminal device; capacity indication information of the terminal device, where the capacity indication information of the terminal device indicates whether the terminal device has a capacity to be assigned as a GM clock node; or request information of the terminal device, where the request information is indicative of that the terminal device requests to be assigned as a GM clock node.

Optionally, in some implementations, the capacity indication information of the terminal device includes at least one of: whether the terminal device supports a high precision clock, clock accuracy supported by the terminal device, whether the terminal device has a capacity to be assigned as the GM clock node for the TSN clock domain, whether the terminal device has a capacity to be assigned as a GM clock node for the multiple TSN clock domains, or whether the terminal device has a capacity to be assigned as a GM clock node for a specific TSN clock domain in the multiple TSN clock domains.

Optionally, in some implementations, the request information of the terminal device includes at least one of: information indicative of that the terminal device requests to be assigned as the GM clock node for the TSN clock domain, information indicative of that the terminal device requests to be assigned as a GM clock node for the multiple TSN clock domains, or information indicative of that the terminal device requests to be assigned as a GM clock node for a specific TSN clock domain in the multiple TSN clock domains.

Optionally, in some implementations, the second information includes at least one of: a measurement result of a measurement reference signal measured by the at least one terminal device, a measurement result of a measurement reference signal measured by the at least one terminal device in a period, the movement information of the at least one terminal device, or the location information of the at least one terminal device.

Optionally, in some implementations, the target terminal device satisfies one of: the target terminal device being a terminal device corresponding to an ID of the terminal device indicated by the first information, the target terminal device being a terminal device corresponding to a TSN clock domain number indicated by the first information, the target terminal device supporting a high precision clock, the target terminal device having a capacity to be assigned as the GM clock node for the TSN clock domain, the target terminal device having a capacity to be assigned as a GM clock node for the multiple TSN clock domains, the target terminal device having a capacity to be assigned as a GM clock node for a specific TSN clock domain in the multiple TSN clock domains, the target terminal device requesting to be assigned as the GM clock node for the TSN clock domain, the target terminal device requesting to be assigned as a GM clock node for the multiple TSN clock domains, the target terminal device requesting to be assigned as a GM clock node for the specific TSN clock domain in the multiple TSN clock domains, the target terminal device being a terminal device that has a channel quality higher than a first threshold in the at least one terminal device, the target terminal device being a terminal device that has a channel quality higher than a second threshold in a period in the at least one terminal device, the target terminal device being a terminal device moved in a specific range, or the target terminal device being a terminal device located in the specific range.

Optionally, in some implementations, the specific range is a network coverage of a communication system.

Optionally, in some implementations, the first network device is one of: an access network device, an SMF entity, an AMF entity, a UPF entity, or a network control node in a communication system, where the communication system provides services to a TSN system corresponding to the multiple TSN clock domains.

Optionally, in some implementations, the third network device is one of: an access network device, a network control node, an SMF entity, an AMF entity, or a UPF entity.

Optionally, in some implementations, the network control node is a network control node in the communication system or the TSN system.

In conjunction with FIG. 3 to FIG. 5, the above illustrates the method implementations of the disclosure in details. In conjunction with FIG. 6 to FIG. 15, the following will illustrate apparatus implementations of the disclosure in details. It can be understood that, the apparatus implementations are in a one-to-one correspondence with the method implementations, and for similar illustration, reference can be made to the method implementations.

FIG. 6 illustrates a schematic block diagram of a device 500 for wireless communication provided in implementations of the disclosure. As illustrated in FIG. 6, the device 500 includes a processing unit 510.

The processing unit 510 is configured to determine at least one target terminal device as a GM clock node for multiple TSN clock domains. The multiple TSN clock domains are TSN clock domains served by a communication system which the first network device belongs to.

Optionally, in some implementations, the at least one target terminal device is used to transmit TSN clock synchronization information for the multiple TSN clock domains, and the TSN clock synchronization information is used for synchronization of clocks at nodes in the multiple TSN clock domains.

Optionally, in some implementations, the TSN clock synchronization information is carried in a gPTP message.

Optionally, in some implementations, the processing unit 510 is specifically configured to determine the at least one target terminal device as the GM clock node for the multiple TSN clock domains according to first information and/or second information. The first information indicates reference information of that a terminal device is assigned as a GM clock node. The second information indicates at least one of channel quality information, location information, or movement information of at least one terminal device in the multiple TSN clock domains.

Optionally, in some implementations, the first information includes at least one of: an ID of the terminal device; a TSN clock domain number of the terminal device; capacity indication information of the terminal device, where the capacity indication information of the terminal device indicates whether the terminal device has a capacity to be assigned as a GM clock node; or request information of the terminal device, where the request information is indicative of that the terminal device requests to be assigned as a GM clock node.

Optionally, in some implementations, the capacity indication information of the terminal device includes at least one of: whether the terminal device supports a high precision clock, clock accuracy supported by the terminal device, whether the terminal device has a capacity to be assigned as the GM clock node for the TSN clock domain, whether the terminal device has a capacity to be assigned as a GM clock node for the multiple TSN clock domains, or whether the terminal device has a capacity to be assigned as a GM clock node for a specific TSN clock domain in the multiple TSN clock domains.

Optionally, in some implementations, the request information of the terminal device includes at least one of: information indicative of that the terminal device requests to be assigned as the GM clock node for the TSN clock domain, information indicative of that the terminal device requests to be assigned as a GM clock node for the multiple TSN clock domains, or information indicative of that the terminal device requests to be assigned as a GM clock node for a specific TSN clock domain in the multiple TSN clock domains.

Optionally, in some implementations, the second information includes at least one of: a measurement result of a measurement reference signal measured by the at least one terminal device, a measurement result of a measurement reference signal measured by the at least one terminal device in a period, the movement information of the at least one terminal device, or the location information of the at least one terminal device.

Optionally, in some implementations, the multiple TSN clock domains include M TSN clock domains, and the at least one target terminal device includes N target terminal devices. A relation between the M TSN clock domains and the N target terminal devices includes one of: N=1, and the one target terminal device being assigned as a GM clock node for each of the M TSN clock domains; N=M, the M TSN clock domains being in a one-to-one correspondence with the N target terminal devices, and each of the N target terminal devices being assigned as a GM clock node for a corresponding TSN clock domain; or N<M, and each of the N target terminal devices being assigned as a GM clock node for at least one TSN clock domain in the M TSN clock domains.

Optionally, in some implementations, the target terminal device satisfies one of: the target terminal device being a terminal device corresponding to an ID of the terminal device indicated by the first information, the target terminal device being a terminal device corresponding to a TSN clock domain number indicated by the first information, the target terminal device supporting a high precision clock, the target terminal device having a capacity to be assigned as a GM clock node for a TSN clock domain, the target terminal device having a capacity to be assigned as the GM clock node for the multiple TSN clock domains, the target terminal device having a capacity to be assigned as a GM clock node for a specific TSN clock domain in the multiple TSN clock domains, the target terminal device requesting to be assigned as a GM clock node for a TSN clock domain, the target terminal device requesting to be assigned as the GM clock node for the multiple TSN clock domains, the target terminal device requesting to be assigned as a GM clock node for the specific TSN clock domain in the multiple TSN clock domains, the target terminal device being a terminal device that has a channel quality higher than a first threshold in the at least one terminal device, the target terminal device being a terminal device that has a channel quality higher than a second threshold in a period in the at least one terminal device, the target terminal device being a terminal device moved in a specific range, or the target terminal device being a terminal device located in the specific range.

Optionally, in some implementations, the device 500 further includes a communication unit. The communication unit is configured to obtain the first information from a terminal device or a second network device.

Optionally, in some implementations, the communication unit is specifically configured to receive the first information transmitted by the terminal device through an NAS message.

Optionally, in some implementations, the NAS message is an NAS message in network registration or a PDU session establishment procedure.

Optionally, in some implementations, the processing unit 510 is further configured to indicate the target terminal device to initiate an establishment procedure of a PDU session, where the PDU session is used for transmission of TSN clock synchronization information.

Optionally, in some implementations, the PDU session has a reservation ID, and the reservation ID is indicative of that a terminal device corresponding to the PDU session is a GM clock node and/or the PDU session is able to carry the TSN clock synchronization information.

Optionally, in some implementations, if a terminal device that is assigned as a first GM clock node is required to be changed, the processing unit 510 is further configured to indicate a first terminal device to release a PDU session that is used for transmission of TSN clock synchronization information, and indicate a second terminal device to initiate a PDU session modification request or a PDU session establishment request. The first GM clock node is a GM clock node for at least one TSN clock domain in the multiple TSN clock domains. The first terminal device is a terminal device that is currently assigned as the first GM clock node, and the second terminal device is a next terminal device to be assigned as the first GM clock node. A modified PDU session or a re-established PDU session is used for transmission of TSN clock synchronization information for the at least one TSN clock domain.

Optionally, in some implementations, according to at least one of a channel quality of at least one terminal device in the multiple TSN clock domains, an operating state of the first terminal device, or movement information of the first terminal device, the processing unit 510 is further configured to determine whether to change the terminal device that is assigned as the GM clock node.

Optionally, in some implementations, the processing unit 510 is specifically configured to determine to change the terminal device that is assigned as the GM clock node, upon satisfying at least one of: the at least one terminal device including a terminal device that has a channel quality higher than a channel quality of the first terminal device, the first terminal device being in a power failure or an abnormal operation, or the first terminal device being moved out of a specific range.

Optionally, in some implementations, the specific range is a network coverage of a communication system.

Optionally, in some implementations, a TSN clock domain number of the at least one terminal device is the same as that of the first terminal device.

Optionally, in some implementations, the processing unit 510 is further configured to determine a next terminal device to be assigned as the GM clock node for the multiple TSN clock domains, according to third information and/or first indication information of a second network device. The third information includes at least one of: a channel quality of at least one terminal device in the multiple TSN clock domains, location information of the at least one terminal device, movement information of the at least one terminal device, or information of a GM clock node for another TSN clock domain in the multiple TSN clock domains except the at least one TSN clock domain.

Optionally, in some implementations, the first indication information of the second network device includes at least one of: an ID of a terminal device; a reservation ID of a PDU session, where the reservation ID is indicative of that a terminal device corresponding to the PDU session is a GM clock node and/or the PDU session is able to carry the TSN clock synchronization information; or a TSN clock domain number.

Optionally, in some implementations, the second terminal device satisfies one of: the second terminal device being a terminal device that has a channel quality higher than a channel quality of the first terminal device in the at least one terminal device, the second terminal device being a terminal device that has a channel quality higher than a third threshold in the at least one terminal device, the second terminal device being a terminal device that has a channel quality higher than a fourth threshold in a period in the at least one terminal device, the second terminal device being a terminal device moved in a specific range, the second terminal device being a terminal device located in the specific range, the second terminal device being a terminal device corresponding to the GM clock node for the other TSN clock domain, the second terminal device having an ID that is the ID of the terminal device indicated by the first indication information, the second terminal device having a PDU session ID that is the reservation ID, or the second terminal device having a TSN clock domain number that is the TSN clock domain number indicated by the first indication information.

Optionally, in some implementations, the first device is one of: an access network device, an SMF entity, an AMF entity, a UPF entity, or a network control node in a communication system, where the communication system provides services to a TSN system corresponding to the multiple TSN clock domains.

Optionally, in some implementations, the second network device is one of: a network control node, an SMF entity, an AMF entity, or a UPF entity.

Optionally, in some implementations, the network control node is a network control node in the communication system or the TSN system.

Optionally, in some implementations, the above communication unit may be a communication interface or a transceiver, or an input/output interface on a communication chip or a system on a chip (SoC). The above processing unit may be one or more processors.

It can be understood that, according to implementations of the disclosure, the device 500 can correspond to the first network device in the method implementations of the disclosure, and the above-mentioned and other operations and/or functions of each unit in the device 500 respectively implement a corresponding procedure performed by the first network device in the method 200 illustrated in FIG. 3, which will not be repeated herein for sake of simplicity.

Figure 7:
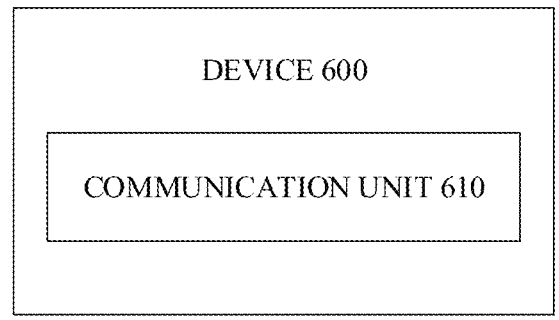
FIG. 7 is another schematic block diagram illustrating a device for wireless communication according to implementations of the disclosure.

FIG. 7 is a schematic block diagram illustrating a device 600 for wireless communication according to implementations of the disclosure. As illustrated in FIG. 7, the device 600 includes a communication unit 610.

The communication unit 610 is configured to transmit first information and/or second information to a first network device. The first information and/or the second information is used for the first network device to determine at least one target terminal device as a GM clock node for multiple TSN clock domains. The multiple TSN clock domains are TSN clock domains served by a communication system which the first network device belongs to. The first information indicates reference information of that a terminal device is assigned as a GM clock node. The second information indicates at least one of channel quality information, location information, or movement information of at least one terminal device in the multiple TSN clock domains.

Optionally, in some implementations, the at least one target terminal device is used to transmit TSN clock synchronization information for the multiple TSN clock domains, and the TSN clock synchronization information is used for synchronization of clocks at nodes in the multiple TSN clock domains.

Optionally, in some implementations, the TSN clock synchronization information is carried in a gPTP message.

Optionally, in some implementations, the first information includes at least one of: an ID of the terminal device; a TSN clock domain number of the terminal device; capacity indication information of the terminal device, where the capacity indication information of the terminal device indicates whether the terminal device has a capacity to be assigned as a GM clock node; or request information of the terminal device, where the request information is indicative of that the terminal device requests to be assigned as a GM clock node.

Optionally, in some implementations, the capacity indication information of the terminal device includes at least one of: whether the terminal device supports a high precision clock, clock accuracy supported by the terminal device, whether the terminal device has a capacity to be assigned as a GM clock node for a TSN clock domain, whether the terminal device has a capacity to be assigned as the GM clock node for the multiple TSN clock domains, or whether the terminal device has a capacity to be assigned as a GM clock node for a specific TSN clock domain in the multiple TSN clock domains.

Optionally, in some implementations, the request information of the terminal device includes at least one of: information indicative of that the terminal device requests to be assigned as a GM clock node for a TSN clock domain, information indicative of that the terminal device requests to be assigned as the GM clock node for the multiple TSN clock domains, or information indicative of that the terminal device requests to be assigned as a GM clock node for a specific TSN clock domain in the multiple TSN clock domains.

Optionally, in some implementations, the second information includes at least one of: a measurement result of a measurement reference signal measured by the at least one terminal device, a measurement result of a measurement reference signal measured by the at least one terminal device in a period, the movement information of the at least one terminal device, or the location information of the at least one terminal device.

Optionally, in some implementations, the multiple TSN clock domains include M TSN clock domains, and the at least one target terminal device includes N target terminal devices. A relation between the M TSN clock domains and the N target terminal devices includes one of: N=1, and the one target terminal device being assigned as a GM clock node for each of the M TSN clock domains; N=M, the M TSN clock domains being in a one-to-one correspondence with the N target terminal devices, and each of the N target terminal devices being assigned as a GM clock node for a corresponding TSN clock domain; or N<M, and each of the N target terminal devices being assigned as a GM clock node for at least one TSN clock domain in the M TSN clock domains.

Optionally, in some implementations, the target terminal device satisfies one of: the target terminal device being a terminal device corresponding to an ID of the terminal device indicated by the first information, the target terminal device being a terminal device corresponding to a TSN clock domain number indicated by the first information, the target terminal device supporting a high precision clock, the target terminal device having a capacity to be assigned as a GM clock node for a TSN clock domain, the target terminal device having a capacity to be assigned as the GM clock node for the multiple TSN clock domains, the target terminal device having a capacity to be assigned as a GM clock node for a specific TSN clock domain in the multiple TSN clock domains, the target terminal device requesting to be assigned as a GM clock node for a TSN clock domain, the target terminal device requesting to be assigned as the GM clock node for the multiple TSN clock domains, the target terminal device requesting to be assigned as a GM clock node for the specific TSN clock domain in the multiple TSN clock domains, the target terminal device being a terminal device that has a channel quality higher than a first threshold in the at least one terminal device, the target terminal device being a terminal device that has a channel quality higher than a second threshold in a period in the at least one terminal device, the target terminal device being a terminal device moved in a specific range, or the target terminal device being a terminal device located in the specific range.

Optionally, in some implementations, the device is a terminal device or a second network device.

Optionally, in some implementations, the terminal device transmits the first information to the first network device through an NAS message.

Optionally, in some implementations, the NAS message is an NAS message in network registration or a PDU session establishment procedure.

Optionally, in some implementations, the second network device is one of: a network control node, an SMF entity, an AMF entity, or a UPF entity.

Optionally, in some implementations, the first network device is one of: an access network device, an SMF entity, an AMF entity, a UPF entity, or a network control node in a communication system, where the communication system provides services to a TSN system corresponding to the multiple TSN clock domains.

Optionally, in some implementations, the network control node is a network control node in the communication system or the TSN system.

It can be understood that, according to implementations of the disclosure, the device 600 can correspond to the first device in the method implementations of the disclosure, and the above-mentioned and other operations and/or functions of each unit in the device 600 respectively implement a corresponding procedure performed by the first device in the method 300 illustrated in FIG. 4, which will not be repeated herein for sake of simplicity.

Figure 8:
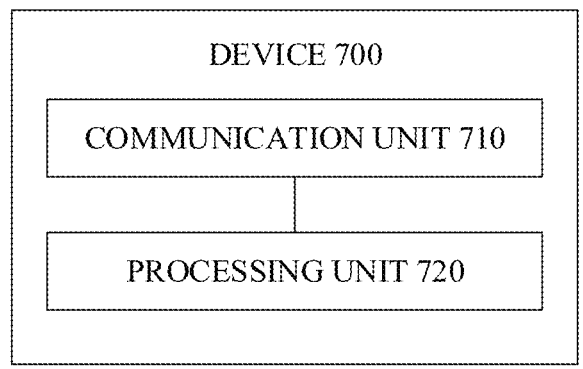
FIG. 8 is yet another schematic block diagram illustrating a device for wireless communication according to implementations of the disclosure.

FIG. 8 illustrates a schematic block diagram illustrating a device 700 for wireless communication according to implementations of the disclosure. As illustrated in FIG. 8, the device 700 includes a communication unit 710 and a processing unit 720.

The communication unit 710 is configured to receive indication information of a first network device. The indication information indicates information of a target terminal device that is determined by the first network device as a GM clock node for a TSN clock domain and/or the indication information is used for triggering the target terminal device to initiate an establishment or modification procedure of a PDU session.

The processing unit 720 is configured to indicate the target terminal device to initiate the establishment or modification procedure of the PDU session according to the indication information. The PDU session is used for transmission of TSN clock synchronization information, and the target terminal device is a GM clock node for at least one TSN clock domain in a multiple TSN clock domains. The multiple TSN clock domains are TSN clock domains served by a communication system which the first network device belongs to.

Optionally, in some implementations, the target terminal device is used to transmit TSN clock synchronization information for the at least one TSN clock domain, and the TSN clock synchronization information is used for synchronization of a clock at a node in the at least one TSN clock domain.

Optionally, in some implementations, the TSN clock synchronization information is carried in a gPTP message.

Optionally, in some implementations, the target terminal device according to first information and/or second information, the first information indicates reference information of that a terminal device is assigned as a GM clock node, and the second information indicates at least one of channel quality information, location information, or movement information of at least one terminal device in the multiple TSN clock domains.

Optionally, in some implementations, the first information includes at least one of: an ID of the terminal device; a TSN clock domain number of the terminal device; capacity indication information of the terminal device, where the capacity indication information of the terminal device indicates whether the terminal device has a capacity to be assigned as a GM clock node; or request information of the terminal device, where the request information is indicative of that the terminal device requests to be assigned as a GM clock node.

Optionally, in some implementations, the capacity indication information of the terminal device includes at least one of: whether the terminal device supports a high precision clock, clock accuracy supported by the terminal device, whether the terminal device has a capacity to be assigned as the GM clock node for the TSN clock domain, whether the terminal device has a capacity to be assigned as a GM clock node for the multiple TSN clock domains, or whether the terminal device has a capacity to be assigned as a GM clock node for a specific TSN clock domain in the multiple TSN clock domains.

Optionally, in some implementations, the request information of the terminal device includes at least one of: information indicative of that the terminal device requests to be assigned as the GM clock node for the TSN clock domain, information indicative of that the terminal device requests to be assigned as a GM clock node for the multiple TSN clock domains, or information indicative of that the terminal device requests to be assigned as a GM clock node for a specific TSN clock domain in the multiple TSN clock domains.

Optionally, in some implementations, the second information includes at least one of: a measurement result of a measurement reference signal measured by the at least one terminal device, a measurement result of a measurement reference signal measured by the at least one terminal device in a period, the movement information of the at least one terminal device, or the location information of the at least one terminal device.

Optionally, in some implementations, the target terminal device satisfies one of: the target terminal device being a terminal device corresponding to an ID of the terminal device indicated by the first information, the target terminal device being a terminal device corresponding to a TSN clock domain number indicated by the first information, the target terminal device supporting a high precision clock, the target terminal device having a capacity to be assigned as the GM clock node for the TSN clock domain, the target terminal device having a capacity to be assigned as a GM clock node for the multiple TSN clock domains, the target terminal device having a capacity to be assigned as a GM clock node for a specific TSN clock domain in the multiple TSN clock domains, the target terminal device requesting to be assigned as the GM clock node for the TSN clock domain, the target terminal device requesting to be assigned as a GM clock node for the multiple TSN clock domains, the target terminal device requesting to be assigned as a GM clock node for the specific TSN clock domain in the multiple TSN clock domains, the target terminal device being a terminal device that has a channel quality higher than a first threshold in the at least one terminal device, the target terminal device being a terminal device that has a channel quality higher than a second threshold in a period in the at least one terminal device, the target terminal device being a terminal device moved in a specific range, or the target terminal device being a terminal device located in the specific range.

Optionally, in some implementations, the specific range is a network coverage of a communication system.

Optionally, in some implementations, the first network device is one of: an access network device, an SMF entity, an AMF entity, a UPF entity, or a network control node in a communication system, where the communication system provides services to a TSN system corresponding to the multiple TSN clock domains.

Optionally, in some implementations, the device 700 is one of: an access network device, a network control node, an SMF entity, an AMF entity, or a UPF entity.

Optionally, in some implementations, the network control node is a network control node in the communication system or the TSN system.

It can be understood that, according to implementations of the disclosure, the device 700 can correspond to the third network device in the method implementations of the disclosure, and the above-mentioned and other operations and/or functions of each unit in the device 700 respectively implement a corresponding process performed by the third network device in the method 300 as illustrated in FIG. 5, which will not be repeated herein for the sake of simplicity.

Optionally, in some implementations, the above communication unit may be a communication interface or a transceiver, or an input/output interface on a communication chip or a SoC. The above processing unit may be one or more processors.

Figure 9:
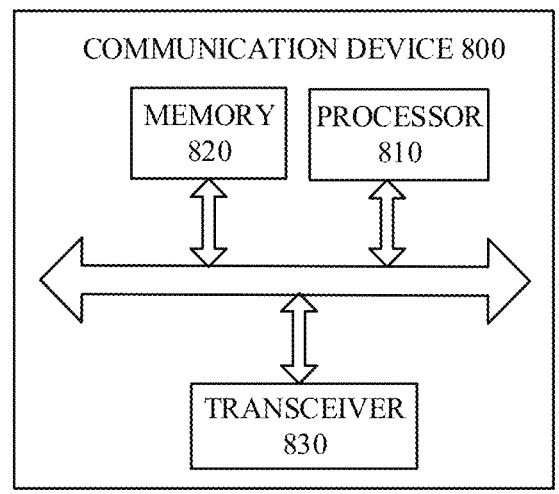
FIG. 9 is a schematic block diagram illustrating a communication device according to implementations of the disclosure.

FIG. 9 is a schematic structural diagram illustrating a communication device 800 provided in implementations of the disclosure. As illustrated in FIG. 9, the communication device 800 includes a processor 810. The processor 810 is configured to invoke and execute computer programs stored in a memory, to perform the methods in the implementations of the disclosure.

Optionally, as illustrated in FIG. 9, the communication device 800 further includes a memory 820. The processor 810 is configured to invoke and execute computer programs stored in the memory 820, to perform the methods in the implementations of the disclosure.

The memory 820 may be a separate device from the processor 810, or be integrated into the processor 810.

Optionally, as illustrated in FIG. 9, the communication device 800 further includes a transceiver 830. The processor 810 can control the transceiver 830 to communicate with other devices. Specifically, the transceiver 830 can transmit information or data to other devices, or receive information or data transmitted by other devices.

The transceiver 830 may include a transmitter and a receiver, and further include one or more antennas.

Optionally, the communication device 800 may be the network device in the implementations of the disclosure, and the communication device 800 can implement a corresponding process implemented by the network device in each of the methods of the implementations of the disclosure, which will not be repeated herein for the sake of simplicity.

Optionally, the communication device 800 may specifically be the mobile terminal/terminal device in the implementations of the disclosure, and the communication device 800 can implement a corresponding process implemented by the mobile terminal/terminal device in each of the methods of the implementations of the disclosure, which will not be repeated herein for the sake of simplicity.

Figure 10:
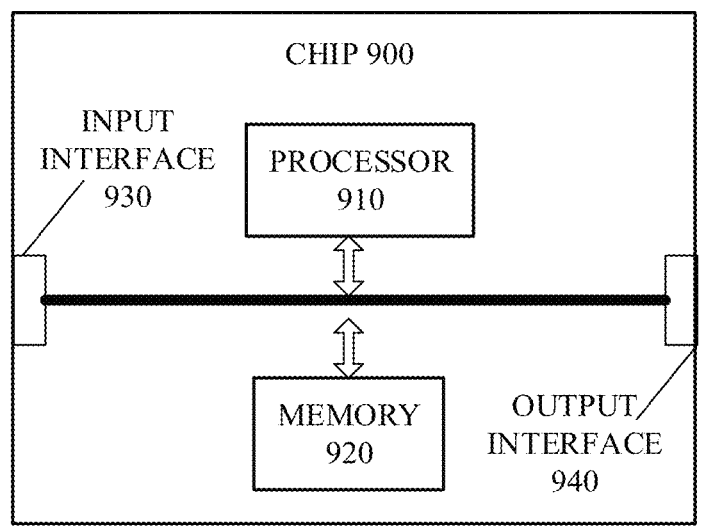
FIG. 10 is a schematic block diagram illustrating a chip according to implementations of the disclosure.

FIG. 10 is a schematic structural diagram illustrating a chip provided in implementations of the disclosure. As illustrated in FIG. 10, a chip 900 includes a processor 910. The processor 910 is configured to invoke and execute computer programs stored in a memory, to perform the methods in the implementations of the disclosure.

Optionally, as illustrated in FIG. 10, the chip 900 further includes a memory 920. The processor 910 is configured to invoke and execute computer programs stored in the memory 920, to perform the methods in the implementations of the disclosure.

The memory 920 may be a separate device from the processor 910, or be integrated into the processor 910.

Optionally, the chip 900 may further include an input interface 930. The processor 910 can control the input interface 930 to communicate with other devices or chips. Specifically, the input interface 930 can obtain information or data transmitted by other devices or chips.

Optionally, the chip 900 may further include an output interface 940. The processor 910 can control the output interface 940 to communicate with other devices or chips. Specifically, the output interface 940 can output information or data to other devices or chips.

Optionally, the chip can be applied to the network device in the implementations of the disclosure, and the chip can implement a corresponding process implemented by the network device in each of the methods in the implementations of the disclosure, which will not be repeated herein for the sake of simplicity.

Optionally, the chip can be applied to the mobile terminal/terminal device in the implementations of the disclosure, and the chip can implement a corresponding process implemented by the mobile terminal/terminal device in each of the methods in the implementations of the disclosure, which will not be repeated herein for the sake of simplicity.

It can be understood that, the chip mentioned in the implementations of the disclosure may also be called a system-level chip, a system chip, a chip system, a system-on-a-chip chip, or the like.

Figure 11:
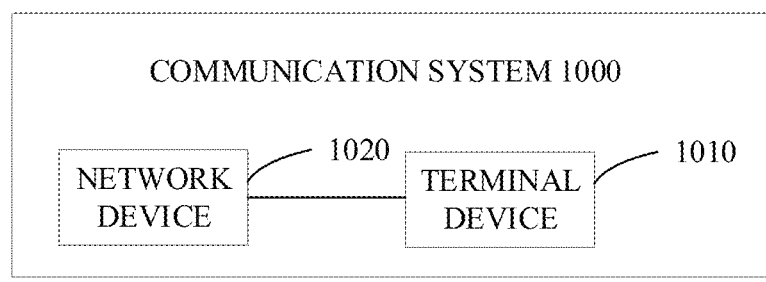
FIG. 11 is a schematic block diagram illustrating a communication system according to implementations of the disclosure.

FIG. 11 is a schematic block diagram illustrating a communication system 1000 provided in implementations of the disclosure. As illustrated in FIG. 11, the communication system 1000 includes a terminal device 1010 and a network device 1020.

The terminal device 1010 can be configured to implement a corresponding function implemented by the terminal device in the foregoing methods, and the network device 1020 can be configured to implement a corresponding function implemented by the first network device, the second network device, or the third network device in the foregoing methods, which will not be repeated herein for the sake of simplicity.

It can be understood that, the processor in the implementations of the disclosure may be an integrated circuit chip with signal processing capabilities. During implementation, each step of the foregoing methods may be completed by an integrated logic circuit in the form of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in the implementations of the disclosure can be implemented or executed. The general purpose processor may be a microprocessor, or the processor may be any conventional processor or the like. The steps of the method disclosed in the implementations of the disclosure may be directly implemented as a hardware decoding processor, or may be performed by hardware and software modules in the decoding processor. The software module can be located in a storage medium such as a random access memory (RAM), a flash memory, a read only memory (ROM), a programmable read-only memory (PROM,) or an electrically erasable programmable memory, registers, and the like. The storage medium is located in the memory. The processor reads the information in the memory, and completes the steps of the above-mentioned method with the hardware thereof.

It can be understood that, in implementations of the disclosure, the memory may be a volatile memory or a non-volatile memory, or may include both the volatile memory and the non-volatile memory. The non-volatile memory may be an ROM, a PROM, an erasable programmable read-only memory (EPROM), an electrically erasable programmable read-only memory (EEPROM), or a flash memory. The volatile memory can be an RAM that acts as an external cache. By way of example but not limitation, many forms of RAM are available, such as a static random access memory (SRAM), a dynamic random access memory (DRAM), a synchronous dynamic random access memory (SDRAM), a double data rate SDRAM (DDRSDRAM), an enhanced SDRAM (ESDRAM), a synclink dynamic random access memory (SLDRAM), and a direct rambus random access memory (DRRAM).

It can be understood that, the above-mentioned memory is an example but not limitation. For example, the memory may be an SRAM, a DRAM, an SDRAM, a DDRSDRAM, an ESDRAM, an SLDRAM, and a DRRAM. That is to say, the memory described herein is intended to include, but is not limited to, these and any other suitable types of memory.

A computer-readable storage medium is further provided in implementations of the disclosure. The computer-readable storage medium is configured to store computer programs.

Optionally, the computer-readable storage medium may be applied to the network device in implementations of the disclosure, and the computer programs enable a computer to perform a corresponding process implemented by the first network device, the second network device, or the third network device in each of the methods in implementations of the disclosure, which will not be repeated herein for the sake of simplicity.

Optionally, the computer-readable storage medium may be applied to the mobile terminal/terminal device in implementations of the disclosure, and the computer programs enable a computer to perform a corresponding process implemented by the mobile terminal/terminal device in each of methods in implementations of the disclosure, which will not be repeated herein for the sake of simplicity.

A computer program product is further provided in implementations of the disclosure. The computer program product includes computer program instructions.

Optionally, the computer program product may be applied to the network device in implementations of the disclosure, and the computer programs enable a computer to perform a corresponding process implemented by the first network device, the second network device, or the third network device in each of the methods in implementations of the disclosure, which will not be repeated herein for the sake of simplicity.

Optionally, the computer program product may be applied to the mobile terminal/terminal device in implementations of the disclosure, and the computer programs enable a computer to perform a corresponding process implemented by the mobile terminal/terminal device in each of methods in implementations of the disclosure, which will not be repeated herein for the sake of simplicity.

A computer program is further provided in implementations of the disclosure.

Optionally, the computer program may be applied to the network device in implementations of the disclosure, and the computer program, when running on a computer, enables the computer to perform a corresponding process implemented by the first network device, the second network device, or the third network device in each of the methods in implementations of the disclosure, which will not be repeated herein for the sake of simplicity.

Optionally, the computer program may be applied to the mobile terminal/terminal device in implementations of the disclosure, and the computer program, when running on a computer, enables the computer to perform a corresponding process implemented by the mobile terminal/terminal device in each of the methods in implementations of the disclosure, which will not be repeated herein for the sake of simplicity.

Those of ordinary skill in the art can appreciate that units and algorithmic operations of various examples described in connection with the implementations herein can be implemented by electronic hardware or by a combination of computer software and electronic hardware. Whether these functions are performed by means of hardware or software depends on particular application and design constraints of the technical solution. Those skilled in the art may use different methods with regard to each particular application to implement the described functionality, but such methods should not be regarded as lying beyond the scope of the disclosure.

It may be evident to those skilled in the art that, for the sake of convenience and simplicity, in terms of the working processes of the foregoing systems, apparatuses, and units, reference can be made to the corresponding processes of the above-mentioned method implementations, which will not be repeated herein.

It may be appreciated that the systems, apparatuses, and methods disclosed in the implementations herein may also be implemented in various other manners. For example, the above-mentioned apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, devices or units, and may be electrical, mechanical, or otherwise.

Separated units as illustrated may or may not be physically separated. Components or parts displayed as units may or may not be physical units, and may reside at one location or may be distributed to multiple networked units. Some of or all the units may be selectively adopted according to practical needs to achieve desired objectives of the disclosure.

Various functional units described in the implementations herein may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the technical solution, or the portion that contributes to the prior art, or all or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in the implementations of the disclosure. The above-mentioned storage medium may include various kinds of medium that can store program codes, such as a universal serial bus (USB) flash disk, a mobile hard drive, an ROM, an RAM, a magnetic disk, or an optical disk.

The above is only a specific implementation of the disclosure and is not intended to limit the scope of protection of the disclosure. Any modification and replacement made by those skilled in the art within the technical scope of the disclosure shall be included in the scope of protection of the disclosure. Therefore, the scope of protection of the disclosure should be stated in the scope of protection of the claims.

What is claimed is:

1. A method for wireless communication, comprising:
   determining, by a first network device, at least one target terminal device as a grand master (GM) clock node for a plurality of time sensitive network (TSN) clock domains;
   wherein determining, by the first network device, the at least one target terminal device as the GM clock node for the plurality of TSN clock domains comprises:
   determining, by the first network device, the at least one target terminal device as the GM clock node for the plurality of TSN clock domains according to first information and/or second information;
   wherein the first information indicates reference information of that a terminal device is assigned as a GM clock node, and the second information indicates at least one of channel quality information, location information, or movement information of at least one terminal device in the plurality of TSN clock domains.

2. The method of claim 1, wherein the at least one target terminal device is used to transmit TSN clock synchronization information for the plurality of TSN clock domains, and the TSN clock synchronization information is used for synchronization of clocks at nodes in the plurality of TSN clock domains.

3. The method of claim 2, wherein the TSN clock synchronization information is carried in a generic precision time protocol (gPTP) message.

4. The method of claim 1, wherein the first information comprises at least one of:
   an identifier (ID) of the terminal device;
   a TSN clock domain number of the terminal device;
   capacity indication information of the terminal device, wherein the capacity indication information of the terminal device indicates whether the terminal device has a capacity to be assigned as a GM clock node; and
   request information of the terminal device, wherein the request information is indicative of that the terminal device requests to be assigned as a GM clock node.

5. The method of claim 4, wherein the capacity indication information of the terminal device comprises at least one of:
   whether the terminal device supports a high precision clock;
   clock accuracy supported by the terminal device;
   whether the terminal device has a capacity to be assigned as a GM clock node for a TSN clock domain;
   whether the terminal device has a capacity to be assigned as the GM clock node for the plurality of TSN clock domains; and
   whether the terminal device has a capacity to be assigned as a GM clock node for a specific TSN clock domain in the plurality of TSN clock domains.

6. The method of claim 4, wherein the request information of the terminal device comprises at least one of:
   information indicative of that the terminal device requests to be assigned as a GM clock node for a TSN clock domain;
   information indicative of that the terminal device requests to be assigned as the GM clock node for the plurality of TSN clock domains; and
   information indicative of that the terminal device requests to be assigned as a GM clock node for a specific TSN clock domain in the plurality of TSN clock domains.

7. The method of claim 1, wherein the second information comprises at least one of:
   a measurement result of a measurement reference signal measured by the at least one terminal device;
   a measurement result of a measurement reference signal measured by the at least one terminal device in a period;
   the movement information of the at least one terminal device; and
   the location information of the at least one terminal device.

8. The method of claim 1, wherein the plurality of TSN clock domains comprise M TSN clock domains, the at least one target terminal device comprises N target terminal devices, and a relation between the M TSN clock domains and the N target terminal devices comprises one of:
   N=1, and the one target terminal device being assigned as a GM clock node for each of the M TSN clock domains;
   N=M, the M TSN clock domains being in a one-to-one correspondence with the N target terminal devices, and each of the N target terminal devices being assigned as a GM clock node for a corresponding TSN clock domain; and
   N<M, and each of the N target terminal devices being assigned as a GM clock node for at least one TSN clock domain in the M TSN clock domains.

9. The method of claim 1, wherein the target terminal device satisfies one of:
   the target terminal device being a terminal device corresponding to an ID of the terminal device indicated by the first information;
   the target terminal device being a terminal device corresponding to a TSN clock domain number indicated by the first information;
   the target terminal device supporting a high precision clock;
   the target terminal device having a capacity to be assigned as a GM clock node for a TSN clock domain;
   the target terminal device having a capacity to be assigned as the GM clock node for the plurality of TSN clock domains;
   the target terminal device having a capacity to be assigned as a GM clock node for a specific TSN clock domain in the plurality of TSN clock domains;
   the target terminal device requesting to be assigned as a GM clock node for a TSN clock domain;
   the target terminal device requesting to be assigned as the GM clock node for the plurality of TSN clock domains;
   the target terminal device requesting to be assigned as a GM clock node for the specific TSN clock domain in the plurality of TSN clock domains;

the target terminal device being a terminal device that has a channel quality higher than a first threshold in the at least one terminal device;

the target terminal device being a terminal device that has a channel quality higher than a second threshold in a period in the at least one terminal device;

the target terminal device being a terminal device moved in a specific range; and the target terminal device being a terminal device located in the specific range.

10. The method of claim 1, further comprising:
obtaining, by the first network device, the first information from a terminal device or a second network device.

11. The method of claim 1, further comprising:
indicating, by the first network device, the at least one target terminal device to initiate an establishment procedure of a protocol data unit (PDU) session, wherein the PDU session is used for transmission of TSN clock synchronization information.

12. The method of claim 1, further comprising:
if the first network device is required to change a terminal device that is assigned as a first GM clock node,
  indicating, by the first network device, a first terminal device to release a PDU session that is used for transmission of TSN clock synchronization information; and
  indicating, by the first network device, a second terminal device to initiate a PDU session modification request or a PDU session establishment request;
wherein the first GM clock node is a GM clock node for at least one TSN clock domain in the plurality of TSN clock domains, the first terminal device is a terminal device that is currently assigned as the first GM clock node, the second terminal device is a next terminal device to be assigned as the first GM clock node, and a modified PDU session or a re-established PDU session is used for transmission of TSN clock synchronization information for the at least one TSN clock domain.

13. The method of claim 12, further comprising:
determining, by the first network device, a next terminal device to be assigned as the GM clock node for the plurality of TSN clock domains, according to third information and/or first indication information of a second network device;
wherein the third information comprises at least one of: a channel quality of at least one terminal device in the plurality of TSN clock domains, location information of the at least one terminal device, movement information of the at least one terminal device, or information of a GM clock node for another TSN clock domain in the plurality of TSN clock domains except the at least one TSN clock domain.

14. A method for wireless communication, comprising:
transmitting, by a first device, first information and/or second information to a first network device;
wherein the first information and/or the second information is used for the first network device to determine at least one target terminal device as a grand master (GM) clock node for a plurality of time sensitive network (TSN) clock domains, the first information indicates reference information of that a terminal device is assigned as a GM clock node, and the second information indicates at least one of channel quality information, location information, or movement information of at least one terminal device in the plurality of TSN clock domains.

15. The method of claim 14, wherein the at least one target terminal device is used to transmit TSN clock synchronization information for the plurality of TSN clock domains, and the TSN clock synchronization information is used for synchronization of clocks at nodes in the plurality of TSN clock domains.

16. The method of claim 15, wherein the TSN clock synchronization information is carried in a generic precision time protocol (gPTP) message.

17. The method of claim 14, wherein the first information comprises at least one of:
an identifier (ID) of the terminal device;
a TSN clock domain number of the terminal device;
capacity indication information of the terminal device, wherein the capacity indication information of the terminal device indicates whether the terminal device has a capacity to be assigned as a GM clock node; and
request information of the terminal device, wherein the request information is indicative of that the terminal device requests to be assigned as a GM clock node.

18. The method of claim 17, wherein the capacity indication information of the terminal device comprises at least one of:
whether the terminal device supports a high precision clock;
clock accuracy supported by the terminal device;
whether the terminal device has a capacity to be assigned as a GM clock node for a TSN clock domain;
whether the terminal device has a capacity to be assigned as the GM clock node for the plurality of TSN clock domains; and
whether the terminal device has a capacity to be assigned as a GM clock node for a specific TSN clock domain in the plurality of TSN clock domains.

19. A network device, comprising:
a processor; and
a memory storing computer programs which, when executed by the processor, cause the processor to:
determine at least one target terminal device as a grand master (GM) clock node for a plurality of time sensitive network (TSN) clock domains;
wherein the computer programs causing the processor to determine the at least one target terminal device as the GM clock node for the plurality of TSN clock domains are further executed by the processor to cause the processor to:
determine the at least one target terminal device as the GM clock node for the plurality of TSN clock domains according to first information and/or second information;
wherein the first information indicates reference information of that a terminal device is assigned as a GM clock node, and the second information indicates at least one of channel quality information, location information, or movement information of at least one terminal device in the plurality of TSN clock domains.

* * * * *